United States Patent
Ly et al.

(10) Patent No.: US 11,770,855 B2
(45) Date of Patent: Sep. 26, 2023

(54) RANDOM ACCESS CHANNEL (RACH) PROCEDURE DESIGN

(71) Applicant: QUALCOMM Incorporated, San Diego, CA (US)

(72) Inventors: Hung Ly, San Diego, CA (US); Hao Xu, Beijing (CN); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 336 days.

(21) Appl. No.: 15/785,173

(22) Filed: Oct. 16, 2017

(65) Prior Publication Data

US 2018/0110075 A1    Apr. 19, 2018

Related U.S. Application Data

(60) Provisional application No. 62/410,333, filed on Oct. 19, 2016.

(51) Int. Cl.
*H04W 74/08*    (2009.01)

(52) U.S. Cl.
CPC ............... *H04W 74/0833* (2013.01)

(58) Field of Classification Search
CPC . H04W 74/08; H04W 74/0833; H04W 72/04; H04W 72/042
See application file for complete search history.

(56) References Cited

U.S. PATENT DOCUMENTS

| | | | |
|---|---|---|---|
| 8,060,259 B2 | 11/2011 | Budhraja et al. | |
| 8,107,445 B2* | 1/2012 | Lee | H04W 74/004 |
| | | | 370/336 |
| 8,404,710 B2 | 3/2013 | Nagasawa et al. | |
| 9,363,829 B2* | 6/2016 | Di Girolamo | H04W 74/0808 |

(Continued)

FOREIGN PATENT DOCUMENTS

| | | |
|---|---|---|
| CN | 108141299 A | 6/2018 |
| EP | 3520538 A1 | 8/2019 |

(Continued)

OTHER PUBLICATIONS

Nokia et al., "Random Access Principles for New Radio", 3GPP Draft; R1-1609737, 3rd Generation Partnership Project (3GPP), Mobile Competence Centre; 650, Route Des Lucioles; F-06921 Sophia-Anti Polls Cedex; France, vol. RAN WG1, No. Lisbon, Portugal; Oct. 9, 2016, XP051149770 (Year: 2016).*

(Continued)

*Primary Examiner* — Jinsong Hu
*Assistant Examiner* — Farideh Madani
(74) *Attorney, Agent, or Firm* — Patterson & Sheridan, L.L.P.

(57) ABSTRACT

Certain aspects of the present disclosure are generally directed to design of random access channel (RACH) procedures. For example, certain aspects of the present disclosure provide a method for wireless communication by a user equipment (UE). The method generally includes receiving an indication of a RACH procedure capability of a network entity, and selecting a first RACH procedure or a second RACH procedure, based on the indication. The UE may then communicate one or more messages with the network entity based on the selected first RACH procedure or the selected second RACH procedure.

21 Claims, 15 Drawing Sheets

(56) References Cited

U.S. PATENT DOCUMENTS

| | | | |
|---|---|---|---|
| 10,999,874 B2 | 5/2021 | Akkarakaran et al. | |
| 2009/0285180 A1 | 11/2009 | Zhang et al. | |
| 2011/0222476 A1* | 9/2011 | Hole | H04W 74/0833 370/328 |
| 2011/0249641 A1* | 10/2011 | Kwon | H04W 74/0833 370/329 |
| 2013/0064165 A1* | 3/2013 | Chen | H04W 56/0045 370/312 |
| 2013/0077582 A1 | 3/2013 | Kim et al. | |
| 2013/0215848 A1* | 8/2013 | Kato | H04W 74/002 370/329 |
| 2014/0056243 A1* | 2/2014 | Pelletier | H04W 74/04 370/329 |
| 2014/0098761 A1 | 4/2014 | Lee et al. | |
| 2014/0112254 A1* | 4/2014 | Lindoff | H04W 74/002 370/328 |
| 2014/0117410 A1 | 5/2014 | Li et al. | |
| 2016/0337988 A1 | 11/2016 | Nan et al. | |
| 2017/0019930 A1 | 1/2017 | Lee et al. | |
| 2017/0347350 A1* | 11/2017 | Takeda | H04W 72/04 |
| 2018/0042050 A1* | 2/2018 | Kim | H04W 88/08 |
| 2018/0092064 A1* | 3/2018 | Ryu | H04L 5/00 |
| 2018/0092129 A1 | 3/2018 | Guo et al. | |
| 2018/0092139 A1 | 3/2018 | Novlan et al. | |
| 2018/0103465 A1 | 4/2018 | Agiwal et al. | |
| 2018/0110074 A1 | 4/2018 | Akkarakaran et al. | |
| 2020/0037297 A1 | 1/2020 | Pan et al. | |
| 2020/0196234 A1 | 6/2020 | Turtinen et al. | |
| 2020/0196357 A1 | 6/2020 | Park et al. | |
| 2021/0259025 A1 | 8/2021 | Akkarakaran et al. | |

FOREIGN PATENT DOCUMENTS

| | | |
|---|---|---|
| JP | 2020036058 A | 3/2020 |
| WO | 2010148344 A1 | 12/2010 |
| WO | 2018064367 A1 | 4/2018 |

OTHER PUBLICATIONS

ERICSSON LM: "Pseudo CR 45.820-EC-GSM—Concept Description", 3GPP Draft; GPC150088, PCR GSM Evolution—Concept description (Revision of GPC150063), 3rd Generation Partnership Project (3GPP), Mobile Competence Centre; 650, Route Des Lucioles; F-06921 Sophia-Antipolis Cedex; France, vol. TSG GERAN, No. Sofia Antipolis; Feb. 2, 2015, XP050931421, Retrieved from the Internet: URL:http://www.3gpp.org/ftp/Meetings_3GPP_SYNC/GERAN/Docs/ [retrieved on Feb. 2, 2015], 28 pages.

International Search Report and Written Opinion—PCT/US2017/057002—ISA/EPO—dated Jan. 18, 2018.

Nokia et al., "Random Access Principles for New Radio", 3GPP Draft; R1-1609737, 3rd Generation Partnership Project (3GPP), Mobile Competence Centre; 650, Route Des Lucioles; F-06921 Sophia-Anti Polls Cedex; France, vol. RAN WG1, No. Lisbon, Portugal; Oct. 9, 2016, XP051149770, Retrieved from the Internet: URL:http://www.3gpp.org/ftp/Meetings_3GPP_SYNC/RAN1/Docs/ [retrieved on Oct. 9, 2016], 3 pages.

ASUSTEK: "Consideration on Fallback of 2-step RACH Procedure", 3GPP Draft; R2-1700358, 3rd Generation Partnership Project (3GPP), Mobile Competence Centre; 650, Route Des Lucioles; F-06921 Sophia-Anti Polls Cedex; France, vol. RAN WG2, No. Spokane, USA; Jan. 17, 2017, XP051210937, Retrieved from the Internet: URL:http://www.3gpp.org/ftp/Meetings_3GPP_SYNC/RAN2/Docs/ [retrieved on Jan. 17, 2017], 4 pages.

LG Electronics: "Consideration on RACH Procedure in NR", 3GPP Draft; R1-1609267, 3rd Generation Partnership Project (3GPP), Mobile Competence Centre; 650, Route Des Lucioles; F-06921 Sophia-Anti Polls Cedex; France, vol. RAN WG1, No. Lisbon, Portugal; Oct. 9, 2016, XP051149313, Retrieved from the Internet: URL:http://www.3gpp.org/ftp/Meetings_3GPP_SYNC/RAN1/Docs/ [retrieved on Oct. 9, 2016], 5 pages.

QUALCOMM Incorporated: "DL Based Mobility UL Channels", 3GPP Draft; R1-1610169, 3rd Generation Partnership Project (3GPP), Mobile Competence Centre; 650, Route Des Lucioles; F-06921 Sophia-Anti Polls Cedex; France, vol. RAN WG1, No. Lisbon, Portugal; Oct. 9, 2016, XP051150189, Retrieved from the Internet: URL:http://www.3gpp.org/ftp/Meetings_3GPP_SYNC/RAN1/Docs/ [retrieved on Oct. 9, 2016], 3 pages.

Motorola Mobility: "Physical Channel Design for 2-Step RACH", 3GPP Draft, 3GPP TSG RAN WG1 Meeting NR, R1-1700880, Spokane, USA, Jan. 16-20, 2017, Jan. 17, 2017, 5 Pages.

* cited by examiner

RANDOM ACCESS CHANNEL (RACH) PROCEDURE DESIGN

CROSS-REFERENCE TO RELATED APPLICATIONS

This application claims benefit of priority to provisional application No. 62/410,333, filed Oct. 19, 2016, which is expressly incorporated herein by reference in its entirety.

INTRODUCTION

Aspects of the present disclosure are related generally to wireless communications systems, and more particularly, random access channel design.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

A wireless communication network may include a number of network entities that can support communication for a number of user equipments (UEs). A UE may communicate with a network entity via the downlink and uplink. The downlink (or forward link) refers to the communication link from the network entity to the UE, and the uplink (or reverse link) refers to the communication link from the UE to the network entity.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Aspects of the present disclosure are generally directed to techniques for random access channel (RACH) communications.

In an aspect, a method for wireless communications is provided. The method may be performed, for example, by a user equipment (UE). The method generally includes receiving an indication of a random-access channel (RACH) procedure capability of a network entity, selecting a first RACH procedure or a second RACH procedure, based on the indication, and communicating one or more messages with the network entity based on the selected first RACH procedure or the selected second RACH procedure.

In an aspect, a method for wireless communications is provided. The method generally includes determining a RACH procedure capability of a network entity, and transmitting, to a UE, an indication of the RACH procedure capability of the network entity.

In an aspects, an apparatus for wireless communication by a user equipment (UE) is provided. The apparatus generally includes a transceiver configured to receive an indication of a RACH procedure capability of a network entity, a processing system configured to select a first RACH procedure or a second RACH procedure, based on the indication, wherein the transceiver is further configured to communicate one or more messages with the network entity based on the selected first RACH procedure or the selected second RACH procedure.

In an aspects, an apparatus for wireless communication is provided. The apparatus generally includes a processing system configured to determine a RACH procedure capability of a network entity, and a transceiver configured to transmit, to a UE, an indication of the RACH procedure capability of the network entity.

In an aspects, an apparatus for wireless communication by a UE is provided. The apparatus generally includes means for receiving an indication of a RACH procedure capability of a network entity, means for selecting a first RACH procedure or a second RACH procedure, based on the indication, and means for communicating one or more messages with the network entity based on the selected first RACH procedure or the selected second RACH procedure.

In an aspects, an apparatus for wireless communication. The apparatus generally includes means for determining a RACH procedure capability of a second network entity, and means for transmitting, to a UE, an indication of the RACH procedure capability of the second network entity.

Certain aspects are generally directed to a computer-readable medium having instructions stored thereon to cause a UE to receive an indication of a RACH procedure capability of a network entity, select a first RACH procedure or a second RACH procedure, based on the indication, and communicate one or more messages with the network entity based on the selected first RACH procedure or the selected second RACH procedure.

Certain aspects are generally directed to computer-readable medium having instructions stored for determining a RACH procedure capability of a second network entity, and transmitting, to a UE, an indication of the RACH procedure capability of the second network entity.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
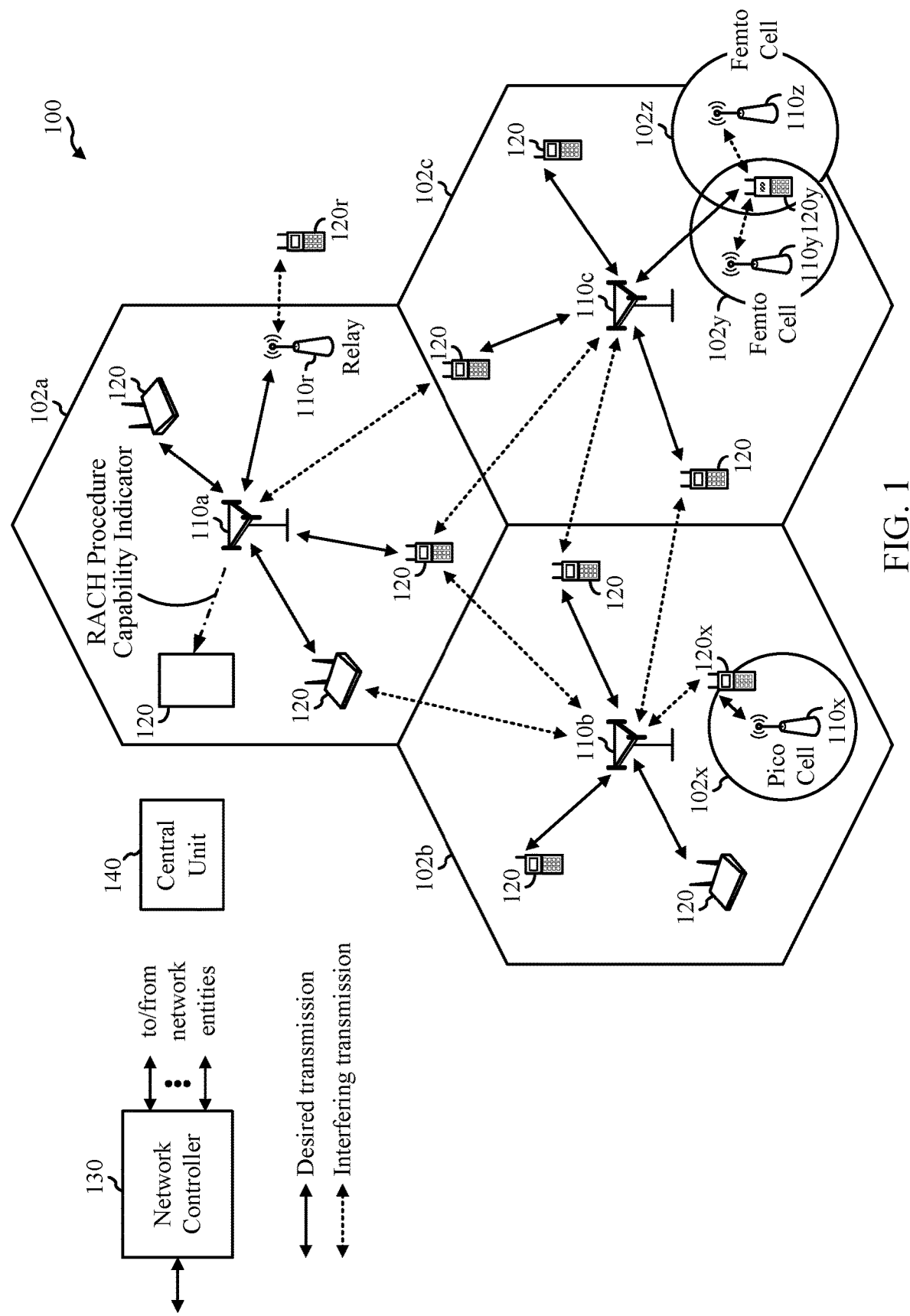
FIG. 1 is a block diagram conceptually illustrating an example telecommunications system, according to certain aspects of the present disclosure.

Aspects of the present disclosure provide apparatus, methods, processing systems, and computer-readable medium for random access channel (RACH) communications. A random-access channel (RACH) is channel that may be shared by multiple UEs and may be used by the UEs to access the network for communications. For example, the RACH may be used for call setup and to access the network for data transmissions. In some cases, RACH may be used for initial access to a network when a user equipment (UE) switches from an idle mode to a radio resource control (RRC) connected active mode, or when performing handover to a target cell in RRC connected mode. Moreover, RACH may be used for downlink (DL) and/or uplink (UL) data arrival when the UE is in RRC idle or RRC inactive modes, and when reestablishing a connection with the network. Certain aspects of the present disclosure provide multiple RACH procedures and techniques for selecting a RACH procedure for communication.

Certain aspects of the present disclosure may be applied to new radio (NR). NR may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may include Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and mission critical targeting ultra-reliable low latency communications (URLLC). For these general topics, different techniques are considered, such as coding, low-density parity check (LDPC), and polar. NR cell may refer to a cell operating according to the new air interface or fixed transport layer. A NR network entity may correspond to one or multiple transmission reception points (TRPs).

NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals (SSs)—in some case cases DCells may transmit SSs. TRPs may transmit downlink signals to UEs indicating the cell type. Based on the cell type indication, the UE may communicate with the TRP. For example, the UE may determine TRPs to consider for cell selection, access, handover, and/or measurement based on the indicated cell type.

In some cases, the UE can receive measurement configuration from the RAN. The measurement configuration information may indicate ACells or DCells for the UE to measure. The UE may monitor/detect measurement reference signals from the cells based on measurement configuration information. In some cases, the UE may blindly detect a mobility reference signal (MRS). In some cases the UE may detect MRS based on MRS-IDs indicated from the RAN. The UE may report the measurement results.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting and the scope of the disclosure is being defined by the appended claims and equivalents thereof.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

It is noted that while aspects may be described herein using terminology commonly associated with 3G and/or 4G wireless technologies, aspects of the present disclosure can be applied in other generation-based communication systems, such as 5G and later, including new radio (NR) technologies.

Example Wireless Communications System

FIG. 1 illustrates an example wireless network 100 in which aspects of the present disclosure may be performed. For example, the wireless network may be new radio or 5G network. UEs 120 may configured to perform the operations 1600 and 1700 discussed in more detail below for determining a cell type of a cell and communicating with the cell based on the determination. Network entity 110 may comprise the transmission reception point (TRP) configured to perform the operations 1700 discussed in more detail below for identifying the cell type and providing an indication of the cell type to the UE 120. The NR network may include the central unit. The new radio network 100 may comprise a central unit 140 configured to perform the certain aspects of the present disclosure.

Certain aspects of the present disclosure are generally directed to design of random access channel (RACH) procedures for communication between a network entity (e.g., network entity 110) and UEs 120. For example, the UE 120 may be capable of implementing a plurality of RACH procedures. The UE 120 may receive an indication of the RACH procedure capability of the network entity 110, based on which, the UE 120 may select a RACH procedure to use for RACH communications with the network entity 110.

The system illustrated in FIG. 1 may be, for example, a long term evolution (LTE) network. The wireless network 100 may include a number of network entities) 110 and other network entities. A network entity may be a station that communicates with the UEs and may also be referred to as a base station, an access point, etc. A Node B is another example of a station that communicates with the UEs.

Each network entity 110 may provide communication coverage for a particular geographic area. In 3GPP, the term "cell" can refer to a coverage area of an network entity and/or an network entity subsystem serving this coverage area, depending on the context in which the term is used.

A network entity may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A network entity for a macro cell may be referred to as a macro network entity. A network entity for a pico cell may be referred to as a pico network entity. An network entity for a femto cell may be referred to as a femto network entity or a home network entity. In the example shown in FIG. 1, the network entity 110*a*, 110*b* and 110*c* may be macro network entity for the macro cells 102*a*, 102*b* and 102*c*, respectively. The network entity 110*x* may be a pico network entity for a pico cell 102*x*. The network entity 110*y* and 110*z* may be femto network entity for the femto cells 102*y* and 102*z*, respectively. A network entity may support one or multiple (e.g., three) cells.

The wireless network 100 may also include relay stations. A relay station is a station that receives a transmission of data and/or other information from an upstream station (e.g., a network entity or a UE) and sends a transmission of the data and/or other information to a downstream station (e.g., a UE or an network entity). A relay station may also be a UE that relays transmissions for other UEs. In the example shown in FIG. 1, a relay station 110*r* may communicate with the network entity 110*a* and a UE 120*r* in order to facilitate communication between the network entity 110*a* and the UE 120*r*. A relay station may also be referred to as a relay network entity, a relay, etc.

The wireless network 100 may be a heterogeneous network that includes network entity of different types, e.g., macro network entity, pico network entity, femto network entity, relays, transmission reception points (TRPs), etc. These different types of network entity may have different transmit power levels, different coverage areas, and different impact on interference in the wireless network 100. For example, macro network entity may have a high transmit power level (e.g., 20 Watts) whereas pico network entity, femto network entity and relays may have a lower transmit power level (e.g., 1 Watt).

The wireless network 100 may support synchronous or asynchronous operation. For synchronous operation, the network entity may have similar frame timing, and transmissions from different network entity may be approximately aligned in time. For asynchronous operation, the network entity may have different frame timing, and transmissions from different network entity may not be aligned in time. The techniques described herein may be used for both synchronous and asynchronous operation.

A network controller 130 may couple to a set of network entity and provide coordination and control for these network entity. The network controller 130 may communicate with the network entity 110 via a backhaul. The network entity 110 may also communicate with one another, e.g., directly or indirectly via wireless or wireline backhaul.

The UEs 120 (e.g., 120*x*, 120*y*, etc.) may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a netbook, a smart book, etc. A UE may be able to communicate with network entities such as a gNBs, macro eNBs, pico eNBs, femto eNBs, relays, etc. In FIG. 1, a solid line with double arrows indicates desired transmissions between a UE and a serving network entity, which is an network entity designated to serve the UE on the downlink and/or uplink. A dashed line with double arrows indicates interfering transmissions between a UE and a network entity.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal fast-Fourier transform (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively. New radio (NR) may use a different air interface, other than OFDM-based. NR networks may include entities such central units or distributed units.

Figure 2:
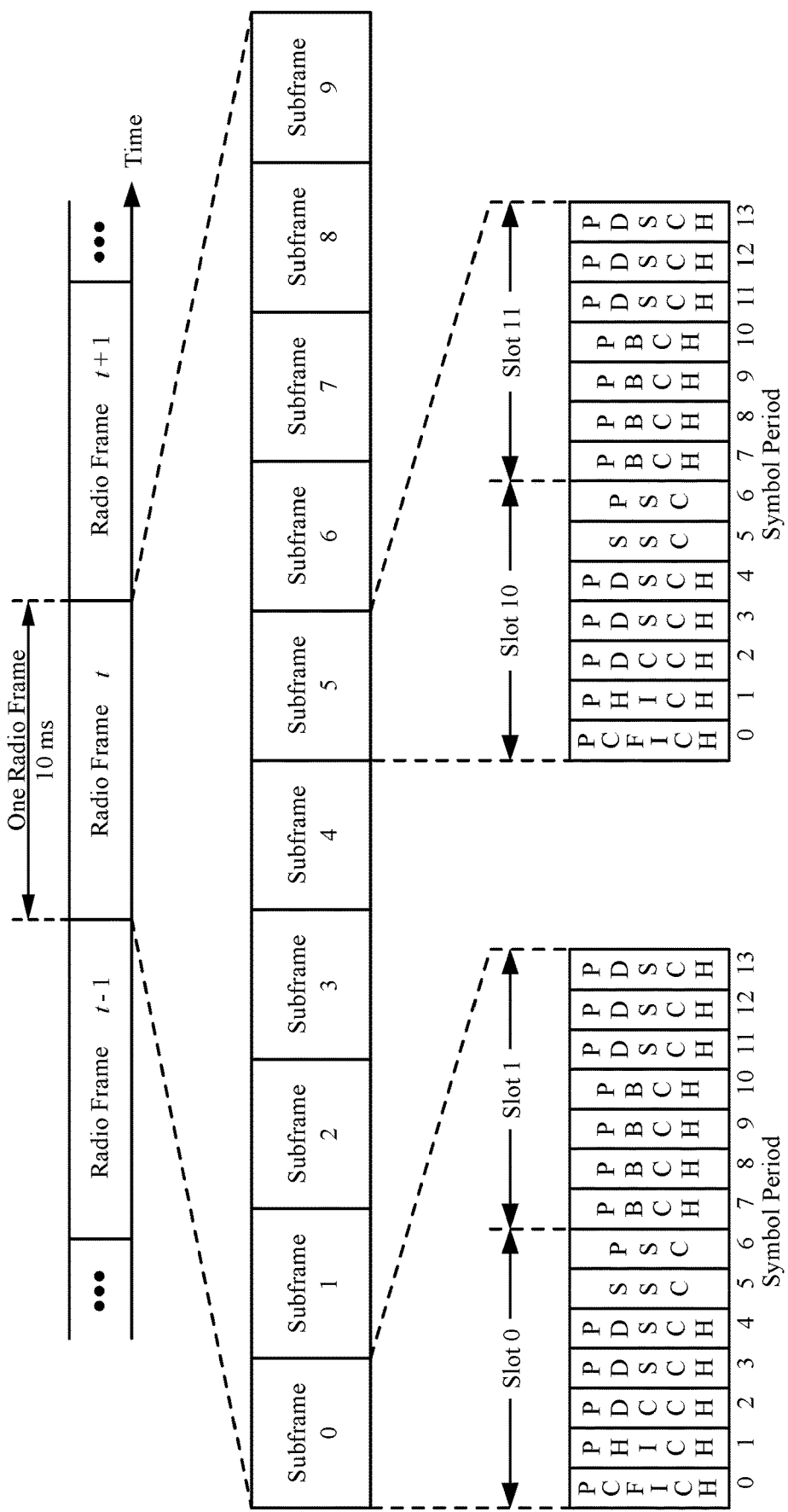
FIG. 2 is a block diagram conceptually illustrating an example downlink frame structure in a telecommunications system, according to certain aspects of the present disclosure.

FIG. 2 shows a down link (DL) frame structure used in a telecommunication systems (e.g., LTE). The transmission timeline for the downlink may be partitioned into units of radio frames. Each radio frame may have a predetermined duration (e.g., 10 milliseconds (ms)) and may be partitioned into 10 sub-frames with indices of 0 through 9. Each sub-frame may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix. The 2L symbol periods in each sub-frame may be assigned indices of 0 through 2L−1. The available time frequency resources may be partitioned into resource blocks. Each resource block may cover N subcarriers (e.g., 12 subcarriers) in one slot.

In some cases, a network entity may send a primary synchronization signal (PSS) and a secondary synchronization signal (SSS) for each cell in the network entity. The primary and secondary synchronization signals may be sent in symbol periods 6 and 5, respectively, in each of sub-frames 0 and 5 of each radio frame with the normal cyclic prefix, as shown in FIG. 2. The synchronization signals may be used by UEs for cell detection and acquisition. The network entity may send a Physical Broadcast Channel (PBCH) in symbol periods 0 to 3 in slot 1 of sub-frame 0. The PBCH may carry certain system information.

The network entity may send a Physical Control Format Indicator Channel (PCFICH) in only a portion of the first symbol period of each sub-frame, although depicted in the entire first symbol period in FIG. 2. The PCFICH may convey the number of symbol periods (M) used for control channels, where M may be equal to 1, 2 or 3 and may change from sub-frame to sub-frame. M may also be equal to 4 for a small system bandwidth, e.g., with less than 10 resource blocks. In the example shown in FIG. 2, M=3. The network entity may send a Physical Hybrid Automatic Retransmission (HARQ) Indicator Channel (PHICH) and a Physical Downlink Control Channel (PDCCH) in the first M symbol periods of each sub-frame (M=3 in FIG. 2). The PHICH may carry information to support HARQ. The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The network entity may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The network entity may send the PSS, SSS and PBCH in the center 1.08 MHz of the system bandwidth used by the network entity. The network entity may send the PCFICH and PHICH across the entire system bandwidth in each symbol period in which these channels are sent. The network entity may send the PDCCH to groups of UEs in certain portions of the system bandwidth. The network entity may send the PDSCH to specific UEs in specific portions of the system bandwidth. The network entity may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. A network entity may send the PDCCH to the UE in any of the combinations that the UE will search.

A UE may be within the coverage of multiple network entity. One of these network entities may be selected to serve the UE. The serving network entity may be selected based on various criteria such as received power, path loss, signal-to-noise ratio (SNR), etc.

Figure 3:
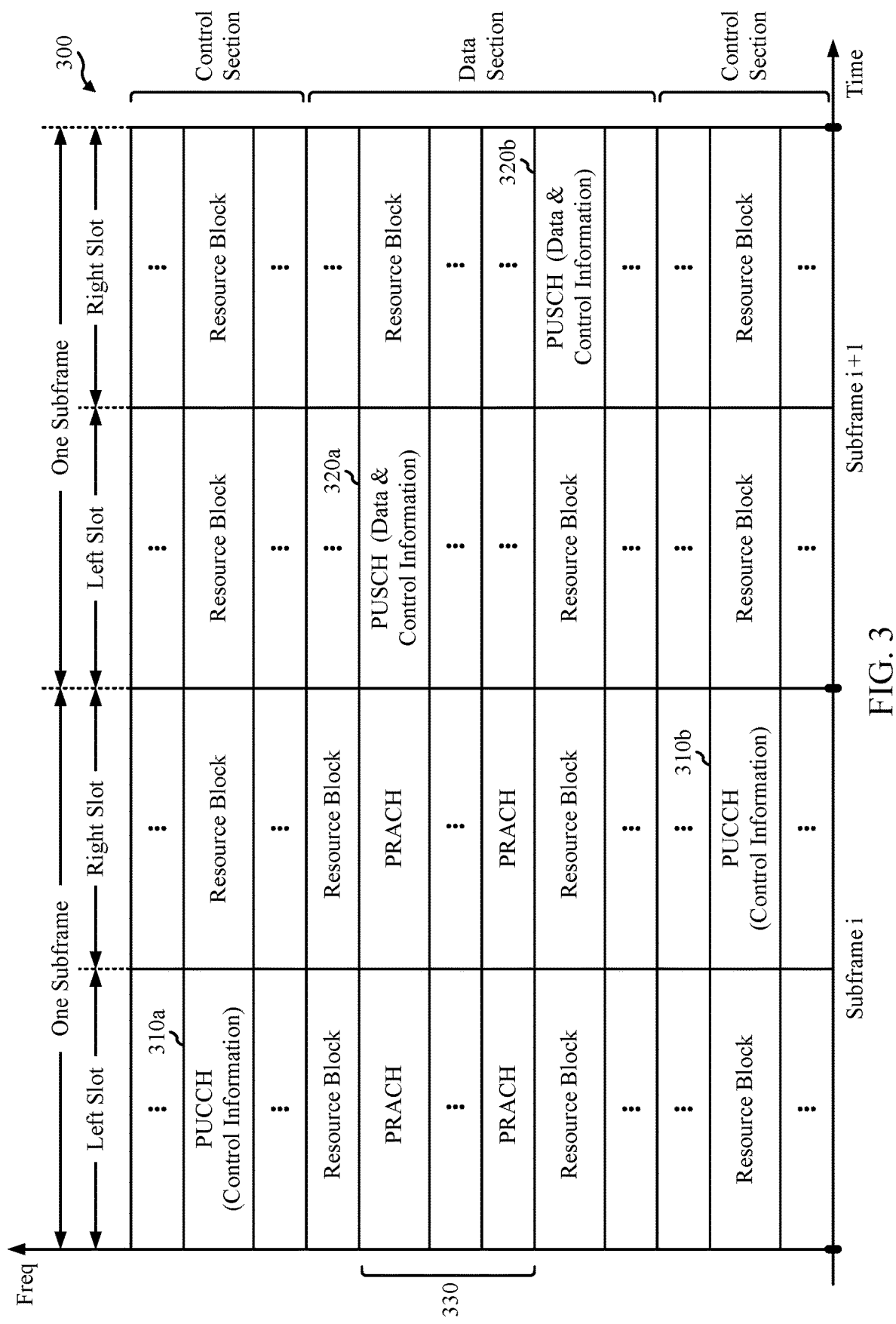
FIG. 3 is a diagram illustrating an example uplink frame structure in a telecommunications system, according to certain aspects of the present disclosure.

FIG. 3 is a diagram 300 illustrating an example of an uplink (UL) frame structure in a telecommunications system (e.g., LTE). The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 310a, 310b in the control section to transmit control information to a network entity. The UE may also be assigned resource blocks 320a, 320b in the data section to transmit data to the network entity. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 330. The PRACH 330 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 4:
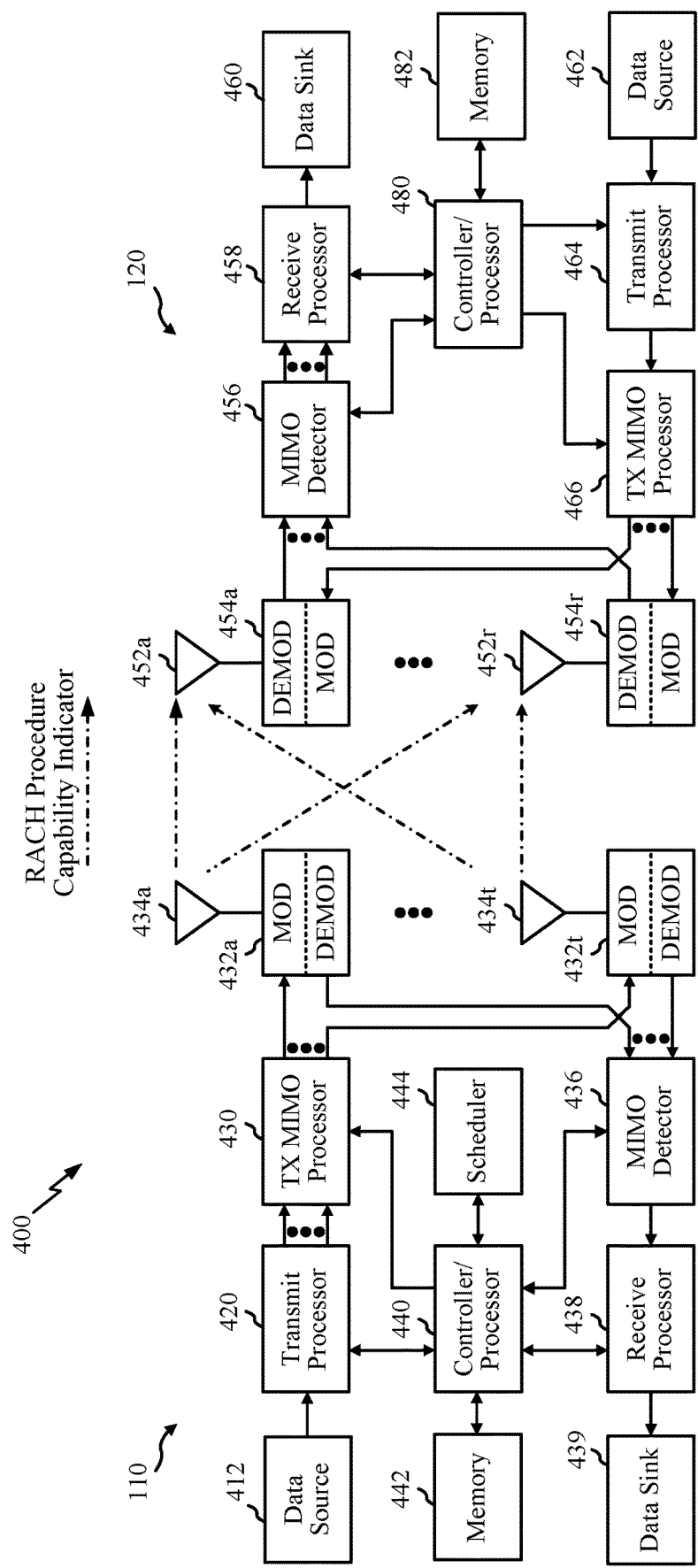
FIG. 4 is a block diagram conceptually illustrating a design of an example network entity and user equipment (UE), according to certain aspects of the present disclosure.

FIG. 4 illustrates example components of the network entity 110 and UE 120 illustrated in FIG. 1, which may be used to implement aspects of the present disclosure. One or more components of the network entity 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the network entity 110 may be used to perform the operations described herein and illustrated with reference to FIGS. 16-17.

Certain aspects of the present disclosure are generally directed to design of RACH procedures for communication between a network entity (e.g., network entity 110) and UEs 120. For example, the UE 120 may be capable of implementing a plurality of RACH procedures. The UE 120 may receive an indication of the RACH procedure capability of the network entity 110, based on which, the UE 120 may select a RACH procedure to use for RACH communications with the network entity 110.

FIG. 4 shows a block diagram of a design of a network entity 110 and a UE 120, which may be one of the base stations/network entity and one of the UEs in FIG. 1. For a restricted association scenario, the network entity 110 may be the macro network entity 110c in FIG. 1, and the UE 120 may be the UE 120y. The network entity 110 may also be a base station of some other type. The network entity 110 may be equipped with antennas 434a through 434t, and the UE 120 may be equipped with antennas 452a through 452r.

At the network entity 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432*a* through 432*t*. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432*a* through 432*t* may be transmitted via the antennas 434*a* through 434*t*, respectively.

At the UE 120, the antennas 452*a* through 452*r* may receive the downlink signals from network entity 110 and may provide received signals to the demodulators (DEMODs) 454*a* through 454*r*, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454*a* through 454*r*, perform MIMO detection on the received symbols if applicable, and provide detected symbols. A receive processor 458 may process (e.g., demodulate, deinterleave, and decode) the detected symbols, provide decoded data for the UE 120 to a data sink 439, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The transmit processor 464 may also generate reference symbols for a reference signal. The symbols from the transmit processor 464 may be precoded by a TX MIMO processor 466 if applicable, further processed by the demodulators 454*a* through 454*r* (e.g., for SC-FDM, etc.), and transmitted to the network entity 110. At the network entity 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the network entity 110 and the UE 120, respectively. The processor 440 and/or other processors and modules at the network entity 110 may perform or direct, e.g., the execution of various processes for the techniques described herein. The processor 480 and/or other processors and modules at the UE 120 may also perform or direct, e.g., the execution of the functional blocks illustrated in FIGS. 16-17, and/or other processes for the techniques described herein. The memories 442 and 482 may store data and program codes for the network entity 110 and the UE 120, respectively. A scheduler 444 may schedule UEs for data transmission on the downlink and/or uplink.

Figure 5:
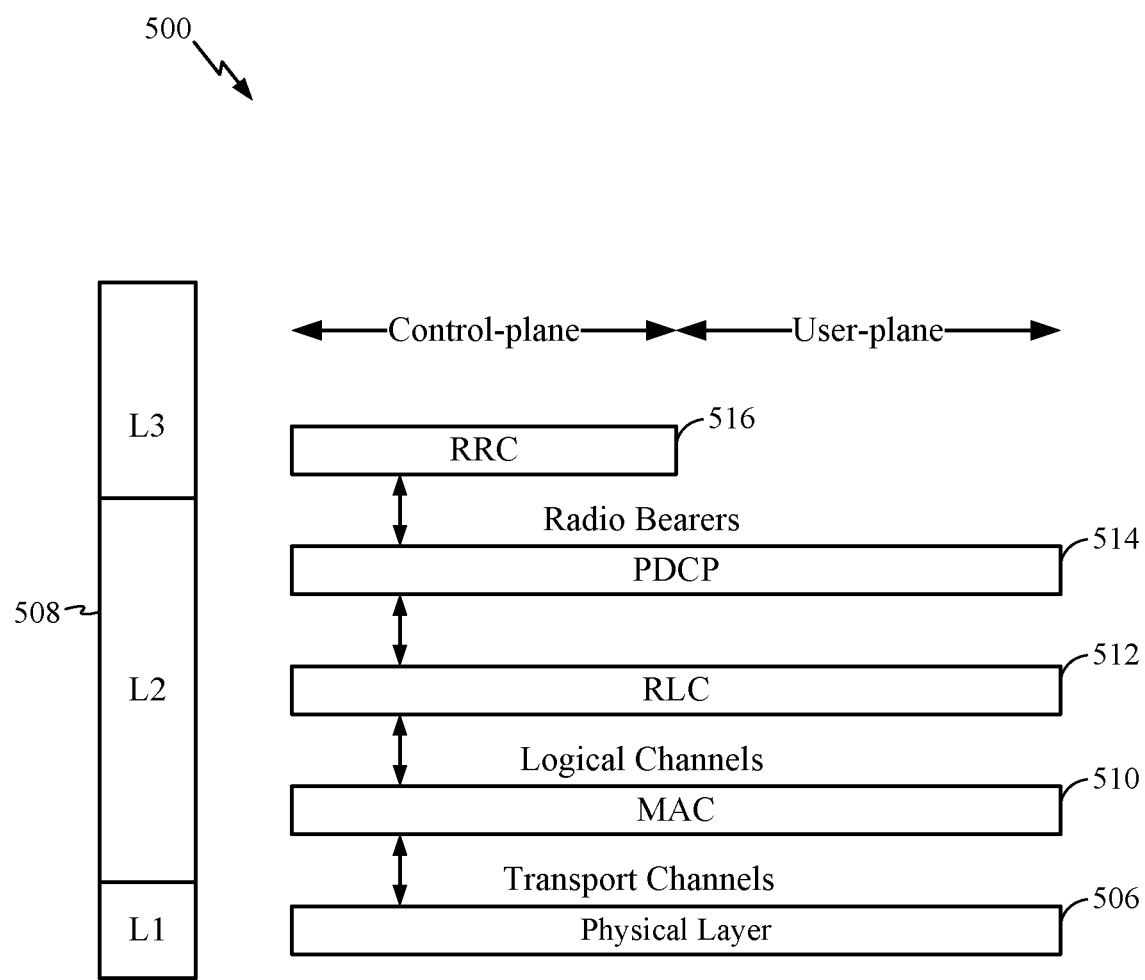
FIG. 5 is a diagram illustrating an example radio protocol architecture for the user and control planes, according to certain aspects of the present disclosure.

FIG. 5 is a diagram 500 illustrating an example of a radio protocol architecture for the user and control planes in LTE. The radio protocol architecture for the UE and the network entity is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and network entity over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the network entity on the network side. Although not shown, the UE may have several upper layers above the L2 layer 508 including a network layer (e.g., IP layer) that is terminated at the packet data network (PDN) gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between network entities. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and network entity is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the network entity and the UE.

Figure 6:
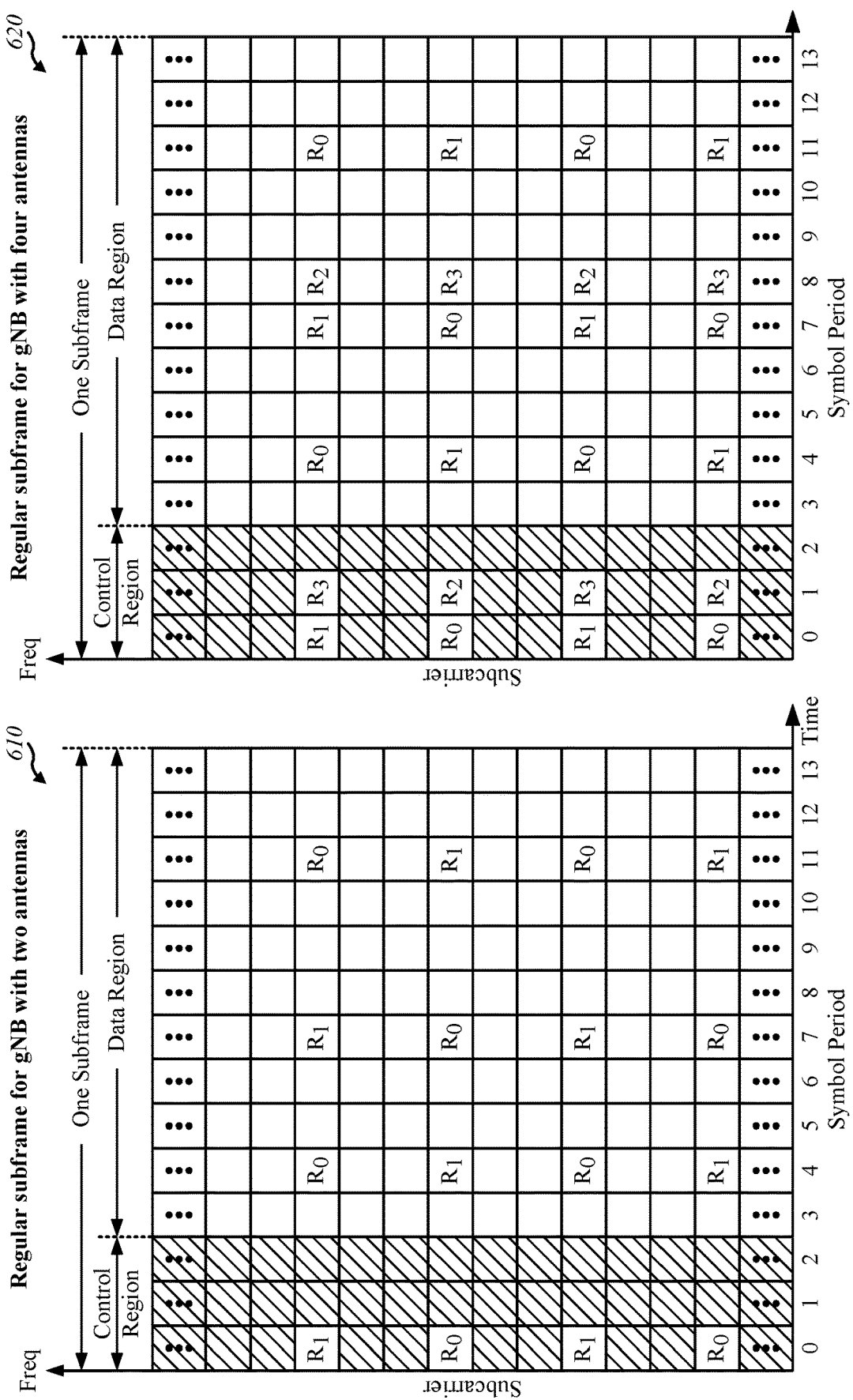
FIG. 6 illustrates an example subframe resource element mapping, according to certain aspects of the present disclosure.

FIG. 6 shows two exemplary subframe formats 610 and 620 for the downlink with the normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 610 may be used for a network entity equipped with two antennas. A cell-specific reference signal (CRS) may be transmitted from antennas 0 and 1 in symbol periods 0, 4, 7 and 11. A reference signal is a signal that is known a priori by a transmitter and a receiver and may also be referred to as a pilot. A CRS is a reference signal that is specific for a cell, e.g., generated based on a cell identity (ID). In FIG. 6, for a given resource element with label $R_a$, a modulation symbol may be transmitted on that resource element from antenna a, and no modulation symbols may be transmitted on that resource element from other antennas. Subframe format 620 may be used for an network entity equipped with four antennas. A CRS may be transmitted from antennas 0 and 1 in symbol periods 0, 4, 7 and 11 and from antennas 2 and 3 in symbol periods 1 and 8. For both subframe formats 610 and 620, a CRS may be transmitted on evenly spaced subcarriers, which may be determined based on cell ID. Different network entitys may transmit their CRSs on the same or different subcarriers, depending on their cell IDs. For both subframe formats 610 and 620, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q−1}.

The wireless network may support hybrid automatic retransmission (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage area of multiple network entitys. One of these network entitys may be selected to serve the UE. The serving network entity may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering network entities.

Example Carrier Aggregation

Figure 7:
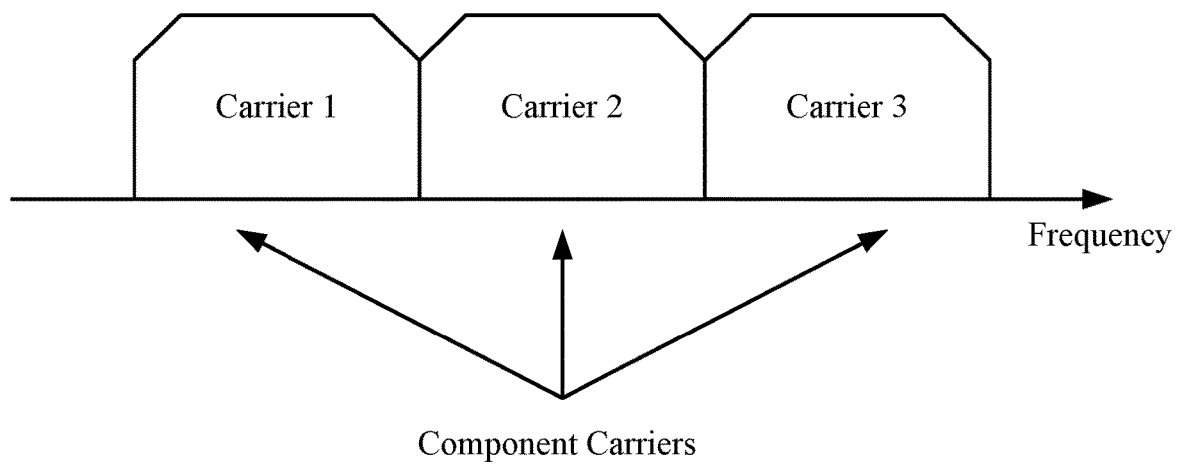
FIG. 7 illustrates an example continuous carrier aggregation type, according to certain aspects of the present disclosure.
Figure 8:
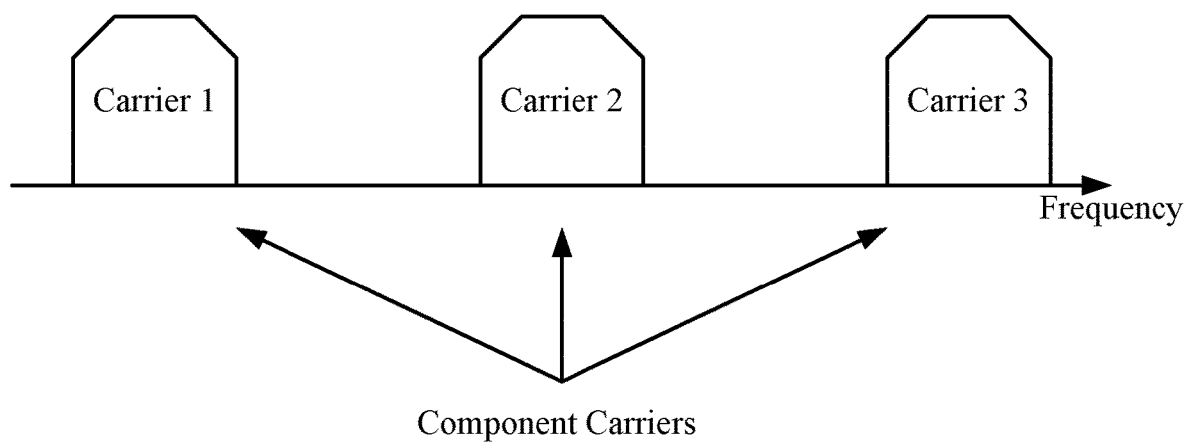
FIG. 8 illustrates an example non-continuous carrier aggregation type, according to certain aspects of the present disclosure.

Certain UEs may use spectrum of up to 20 MHz bandwidths allocated in a carrier aggregation of up to a total of 100 MHz (5 component carriers) used for transmission in each direction. For some mobile systems, two types of carrier aggregation (CA) methods have been proposed, continuous CA and non-continuous CA. They are illustrated in FIGS. 7 and 8. Continuous CA occurs when multiple available component carriers are adjacent to each other (FIG. 7). On the other hand, non-continuous CA occurs when multiple available component carriers are separated along the frequency band (FIG. 8). Both non-continuous and continuous CA aggregates multiple component carriers to serve a single UE.

According to various aspects, the UE operating in a multicarrier system (also referred to as carrier aggregation) is configured to aggregate certain functions of multiple carriers, such as control and feedback functions, on the same carrier, which may be referred to as a "primary carrier." The remaining carriers that depend on the primary carrier for support are referred to as associated secondary carriers. For example, the UE may aggregate control functions such as those provided by the optional dedicated channel (DCH), the nonscheduled grants, a physical uplink control channel (PUCCH), and/or a physical downlink control channel (PDCCH).

Example Dual Connectivity

Presently, mobiles devices (e.g., UEs) receive data from one network entity. However, users on a cell edge may experience high inter-cell interference which may limit the data rates. Multiflow allows users to receive data from two network entity s simultaneously. For example, the UE sends and receives data from the two network entities in two separate streams when the UE is in range of two cell towers in two adjacent cells at the same time. The UE communicates with the two towers simultaneously when the UE is on the edge of either towers' reach. By scheduling two independent data streams to the UE from two different network entities at the same time, multiflow exploits uneven loading in networks. This helps improve the cell edge user experience while increasing network capacity. In one example, throughput data speeds for users at a cell edge may double. "Multiflow" is similar to dual-carrier high-speed packet access (HSPA), however, there are differences. For example, dual-carrier HSPA does not allow for connectivity to multiple towers to connect simultaneously to a device.

Dual connectivity may have benefits in the cellular industry. Dual Connectivity can significantly improve per-user throughput and mobility robustness by allowing users to be connected simultaneously to master cell group (MCG) and secondary cell group (SCG) via MgNB (master gNB) and SeNB (secondary gNB), respectively. The increase in per-user throughput is achieved by aggregating radio resources from at least two gNBs. Moreover, dual connectivity also helps in load balancing between MCG and SCG.

The MgNB and SgNB may not be collocated and can be connected via a non-ideal backhaul (e.g., backhaul). Thus, the different gNBs may use different schedulers, etc. For example, the UE may be dually connected to the macro cell and the small cell, and the gNBs may be connected via a non-ideal backhaul and operate on different carrier frequencies. With carrier aggregation multiple LTE/component carriers are aggregated to serve a single unit of LTE Advanced UE.

In certain aspects, due to the distributed nature of this deployment scenario (separate gNBs connected via a non-ideal backhaul) separate uplink control channels for both gNBs (MgNB and SgNB) are used to support distributed scheduling and independent MAC (Medium Access Control) operation across gNBs. This is unlike CA (Carrier Aggregation) deployment, in which a single MAC/scheduling entity operates across all the carriers and a single uplink control channel is used.

In certain systems, the Primary Cell (PCell of MgNB) is the only cell carrying the uplink control channels (e.g., the PUCCH). For dual connectivity, a special cell on the SgNB may support the uplink control channels for the SgNB. Also, with dual connectivity uplink control channels for both the MgNB and the SgNB are used, one for each gNB.

Example Random Access Channel (RACH) Procedure Design

A random-access channel (RACH) is a channel that may be shared by multiple UEs and may be used by the UEs to access the network for communications. For example, the RACH may be used for call setup and to access the network for data transmissions. In some cases, a RACH may be used for initial access to a network when the UE switches from a radio resource control (RRC) connected idle mode to active mode, or when handing over in RRC connected mode. Moreover, a RACH may be used for downlink (DL) and/or uplink (UL) data arrival when the UE is in RRC idle or RRC inactive modes, and when reestablishing a connection with the network. Certain aspects of the present disclosure provide multiple RACH procedures and techniques for selecting a RACH procedure for communication.

Figure 9:
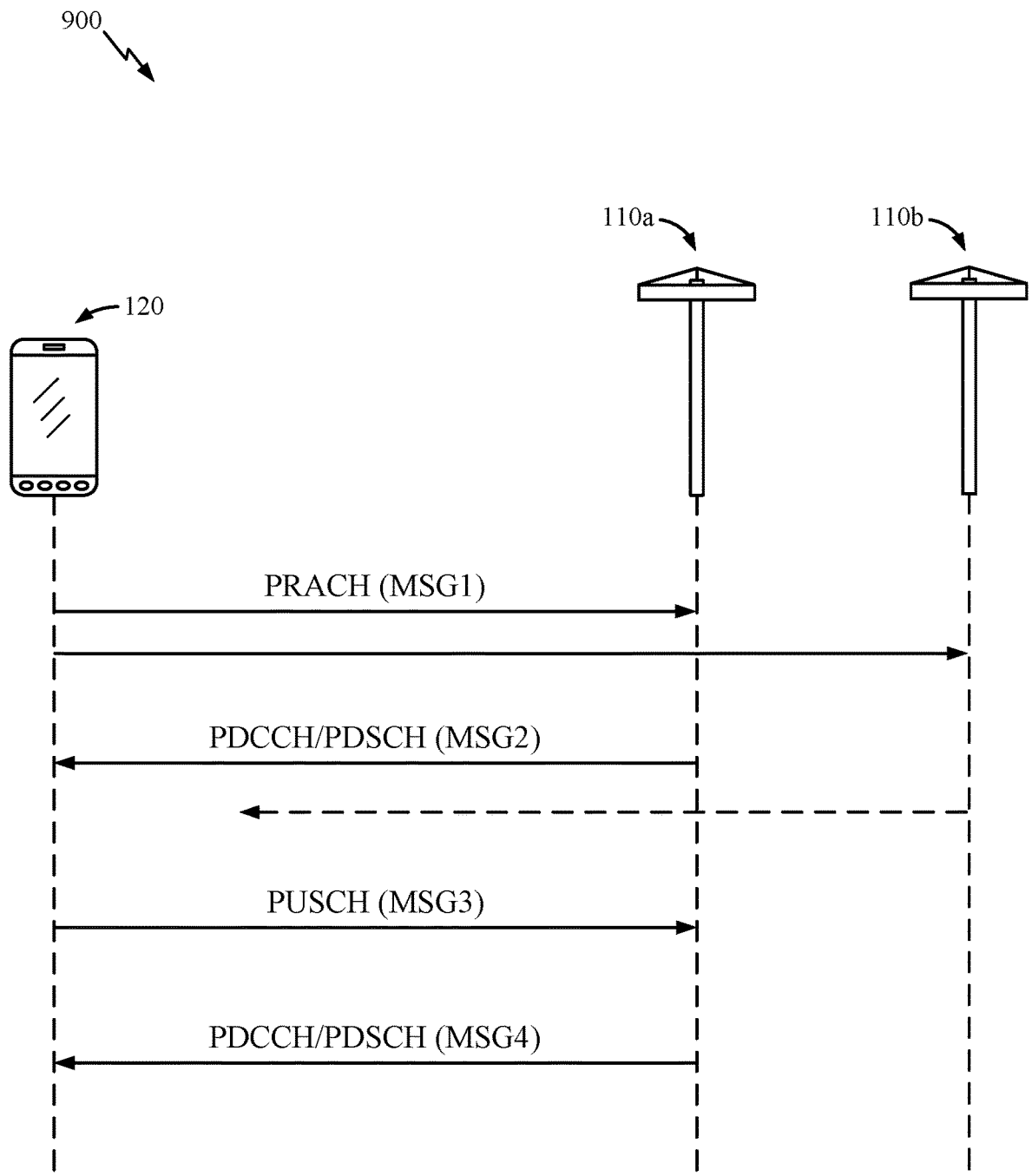
FIG. 9 is a timing diagram illustrating an example four-step random-access channel (RACH) procedure, in accordance with certain aspects of the present disclosure.

FIG. 9 is a timing diagram 900 illustrating an example four-step RACH procedure, in accordance with certain aspects of the present disclosure. A first message (MSG1)

may be sent from the UE 120 to network entity 110a and network entity 110b on the physical random access channel (PRACH). In this case, MSG1 may only include a RACH preamble. At least one of network entity 110a or network entity 110b may respond with a random access response (RAR) message (MSG2) which may include the identifier (ID) of the RACH preamble, a timing advance (TA), an uplink grant, cell radio network temporary identifier (C-RNTI), and a back off indicator. MSG2 may include a PDCCH communication including control information for a following communication on the PDSCH, as illustrated. In response to MSG2, MSG3 is transmitted from the UE 120 to network entity 110a on the PUSCH. MSG2 may include a RRC connection request, a tracking area update, and a scheduling request. The network entity 110a then responds with MSG4 which may include a contention resolution message.

Figure 10:
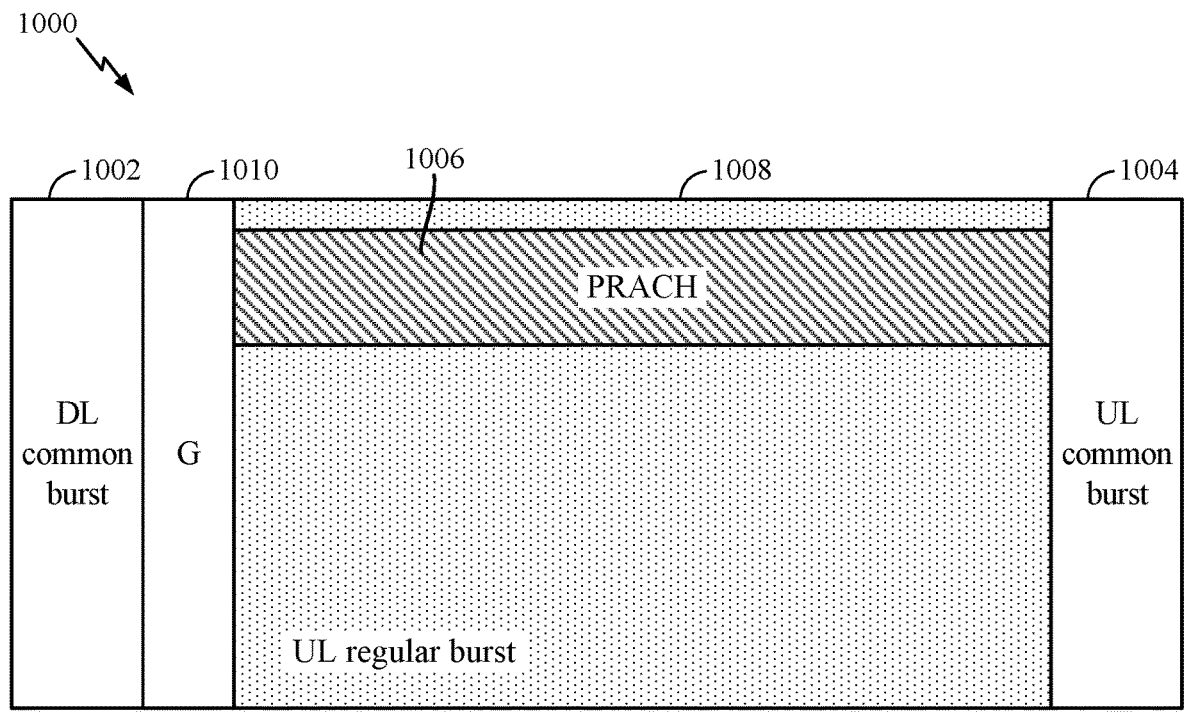
FIG. 10 is an example diagram of a physical random access channel (PRACH) in a time divisional duplex (TDD) self-contained uplink-centric slot, in accordance with certain aspects of the present disclosure.

FIG. 10 is a diagram of an example uplink communication 1000 including a PRACH 1006 in a time divisional duplex (TDD) self-contained uplink-centric slot, in accordance with certain aspects of the present disclosure. The uplink communication 1000 begins with a DL common burst 1002, and ends with an UL common burst 1004, as illustrated. The PRACH 1006 is included as part of the regulator UL burst 1008 between the DL and UL common bursts, as illustrated. In certain aspects, the DL common burst 1002 may be separated from the UL regular burst 1008 by a gap 1010.

Figure 11:
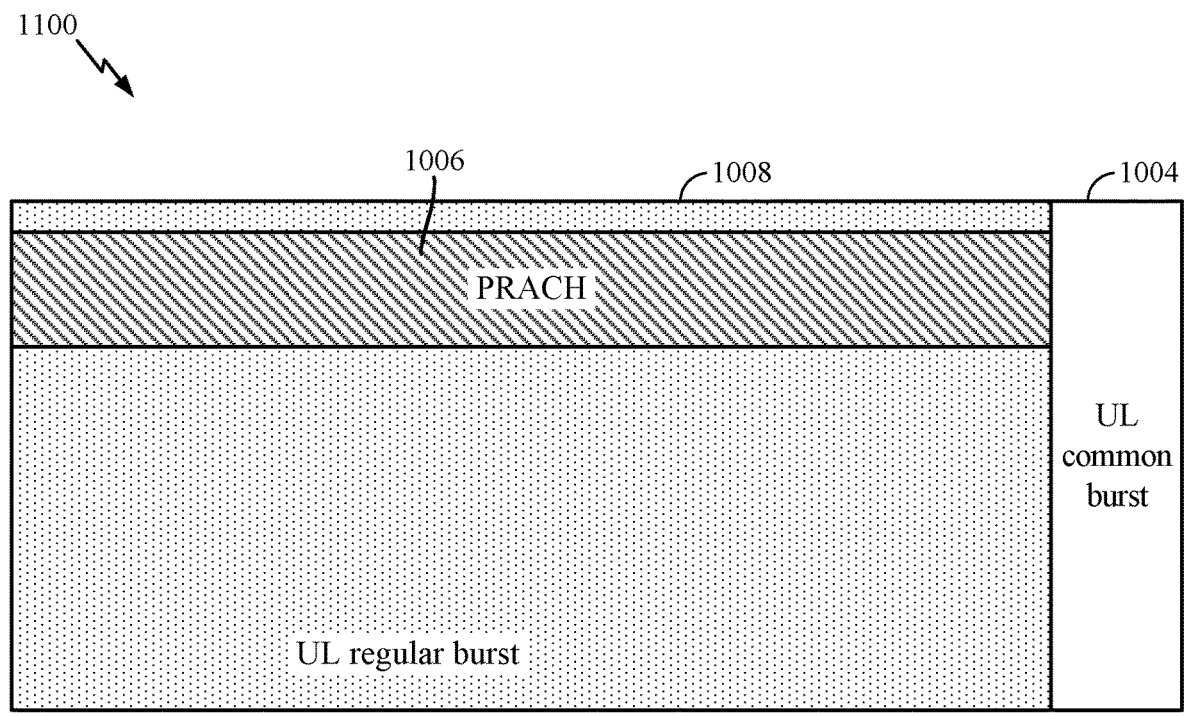
FIG. 11 is an example of a PRACH in a frequency divisional duplex (FDD) self-contained uplink-centric slot, in accordance with certain aspects of the present disclosure.

FIG. 11 is a diagram of an example uplink communication 1100 including a PRACH in a frequency divisional duplex (FDD) self-contained uplink-centric slot, in accordance with certain aspects of the present disclosure. In this case, the uplink communication 1100 does not begin with a DL common burst, as compared to the uplink communication 1000.

Figure 12:
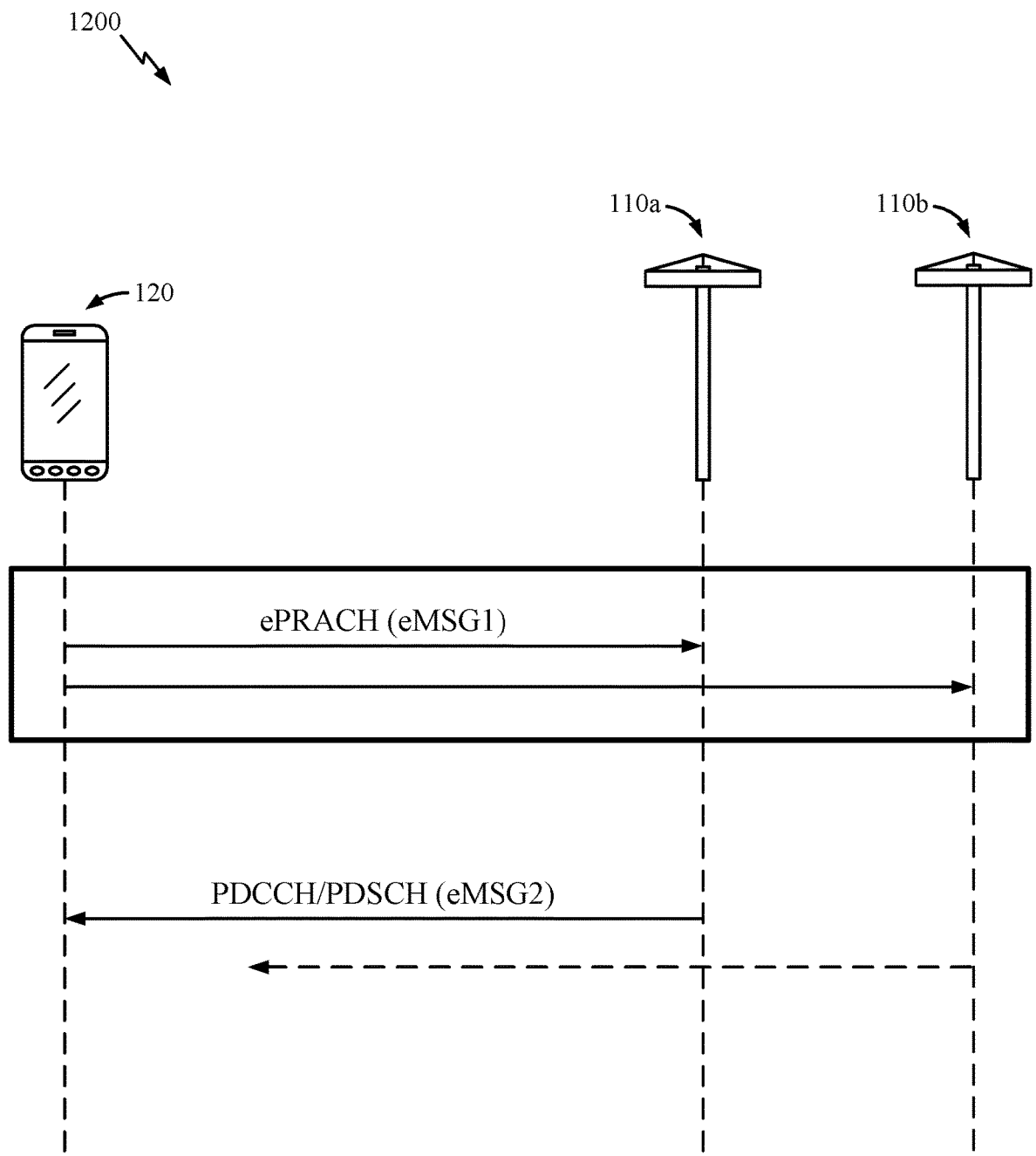
FIG. 12 is a timing diagram illustrating an example two-step RACH procedure, in accordance with certain aspects of the present disclosure.

FIG. 12 is a timing diagram 1200 illustrating an example two-step RACH procedure, in accordance with certain aspects of the present disclosure. A first enhanced message (eMSG1) may be sent from the UE 120 to network entity 110a and network entity 110b on an enhanced physical random access channel (ePRACH). In this case, eMSG1 may include a RACH preamble for random access and demodulation reference signal (RS) for RACH payload demodulation. eMSG1 may also include a RACH message containing the UE-ID and other signaling information (e.g., buffer status report (BSR)) or scheduling request (SR)). At least one network entity 110a or network entity 110b may respond with a random access response (RAR) message (eMSG2) which may include the ID of the RACH preamble, a timing advance (TA), a back off indicator, a contention resolution messages, UL/DL grant, and a transmit power control (TPC) commands.

Figure 13:
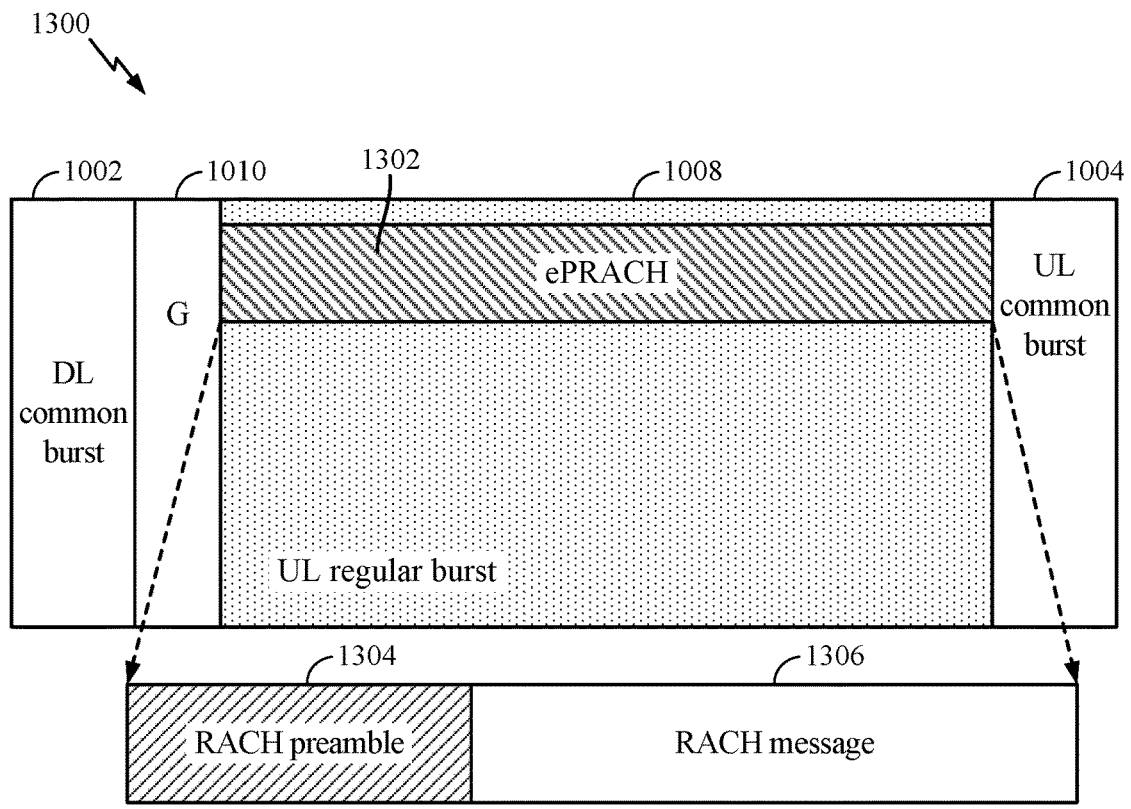
FIG. 13 is an example enhanced physical random access channel (ePRACH) in a TDD self-contained uplink-centric slot, in accordance with certain aspects of the present disclosure.

FIG. 13 is a diagram of an example uplink communication 1300 including an ePRACH 1302 in a time divisional duplex (TDD) self-contained uplink-centric slot, in accordance with certain aspects of the present disclosure. The uplink communication 1300 begins with a DL common burst 1002, and ends with an UL common burst 1004, as illustrated. The ePRACH 1302 is included as part of the regulator UL burst 1008 between the DL and UL common bursts, as illustrated. In this case, the ePRACH 1302 includes both a RACH preamble 1304 and a RACH message 1306.

Figure 14:
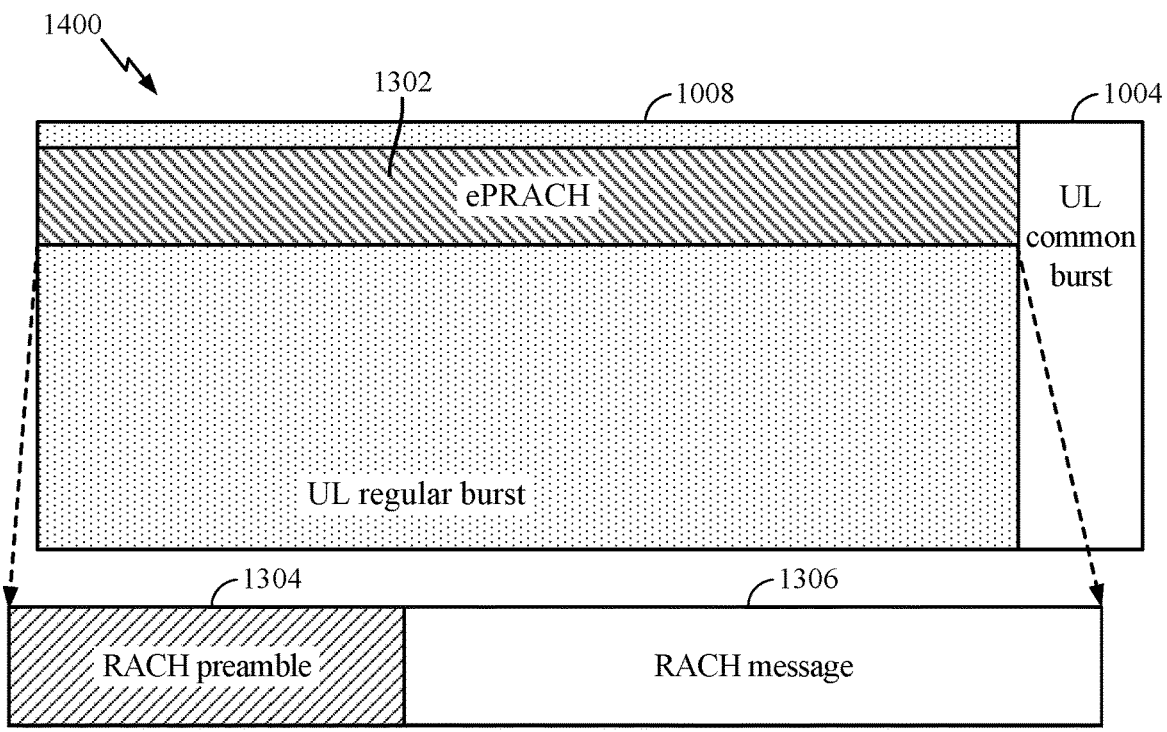
FIG. 14 is an example ePRACH in a FDD self-contained uplink-centric slot, in accordance with certain aspects of the present disclosure.

FIG. 14 is a diagram of an example uplink communication 1400 including an ePRACH 1302 in a frequency divisional duplex (FDD) self-contained uplink-centric slot, in accordance with certain aspects of the present disclosure. In this case, the uplink communication 1400 does not begin with a DL common burst, as compared to the uplink communication 1300. As illustrated, the ePRACH 1302 includes both a RACH preamble 1304 and a RACH message 1306.

In certain aspects of the present disclosure, the four-step RACH procedure may be used when UE transitions from an RRC-Idle mode of operation to an RRC-connected active mode of operations. The two-step RACH procedure may be used when the UE is in handover (HO) in RRC-connected active mode or when the UE transitions from RRC-connected inactive mode to RRC-connected active mode. The modes of operation of the UE are described in more detail with respect to FIG. 15.

Figure 15:
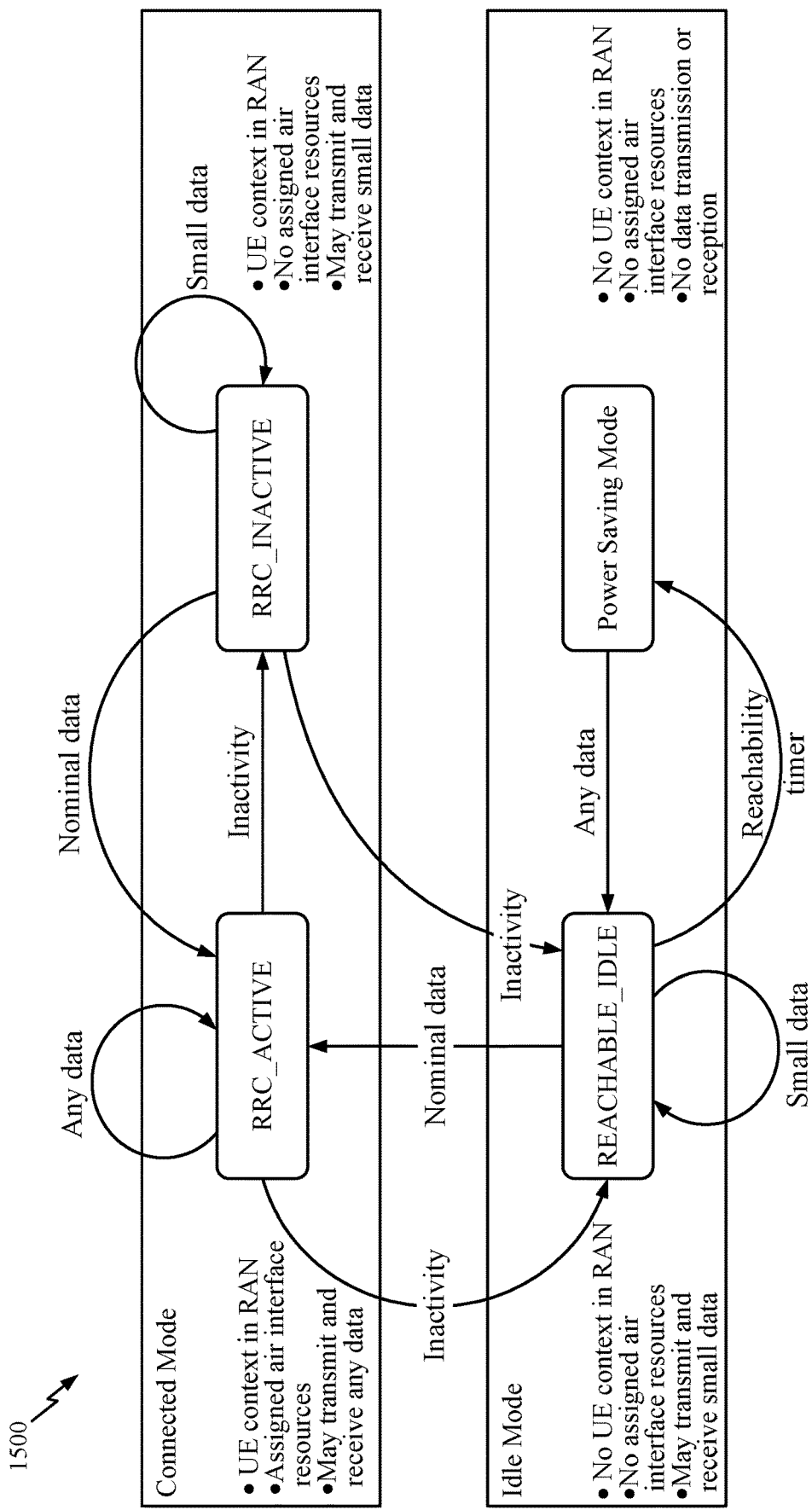
FIG. 15 is an example diagram illustrating different modes of operations of a UE, in accordance with certain aspects of the present disclosure.

FIG. 15 is an example diagram 1500 illustrating different modes of operations of a UE, in accordance with certain aspects of the present disclosure. As illustrated, a UE may be in either an RRC connected mode of operations or an idle mode of operation. In the RRC connected mode of operation, the UE may be either active (RRC ACTIVE mode) or inactive (RRC INACTIVE mode). In both the RRC INACTIVE mode and the RRC ACTIVE mode, there may be a UE context in the radio access network (RAN). In the RRC INACTIVE mode, there may be no air interface resources assigned to the UE and the UE may be able to transmit and receive a small amount of data.

To transmit nominal data, the UE may switch to the RRC ACTIVE mode in which there may be assigned air interface resources to the UE and the UE may be able to transmit and receive any data. Due to inactivity, the UE may enter the idle mode of operation, in which there may be a REACHABLE IDLE mode and a power saving mode. In both the REACHABLE IDLE mode and power saving mode, there may be no UE context in the RAN and no assigned air interface resources for the UE. In the REACHABLE IDLE mode, the UE may be able to transmit and receive a small amount of data. In some cases, after a reachability timer has expired, the UE may enter the power saving mode, where the UE may be unable to transmit and receive data.

The UE modes of operation described with respect to FIG. 15 may be implemented for new radio (NR). NR may refer to radios configured to operate according to a wireless standard, such as 5G (e.g. wireless network 100). NR may include Enhanced mobile broadband (eMBB) targeting wide bandwidth (e.g. 80 MHz beyond), millimeter wave (mmW) targeting high carrier frequency (e.g. 60 GHz), massive machine type communication (mMTC) targeting non-backward compatible MTC techniques, and mission critical targeting ultra-reliable low latency communications (URLLC). An NR cell may refer to a cell operating according to the NR network. A NR network entity (e.g., network entity 110) may correspond to one or multiple transmission reception points (TRPs).

The two-step RACH procedure might not work well in some deployments. For example, in large cell deployments, a cyclic prefix (CP) overhead might be too high since no timing advance information is available at the time of RACH. Moreover, in certain hot spots (e.g., a stadium), the UE may experience high signal collision rates and low RACH message decoding success due to high interference. The four-step RACH procedure should be robust and flexible enough such that it can be used as a fallback when the two-step RACH procedure is unsuccessful. The UE should be aware of the RACH procedure that the network could support. For example, the network may support a four-step RACH procedure when the UE transitions from RRC-Idle to RRC-connected active mode.

Figure 16:
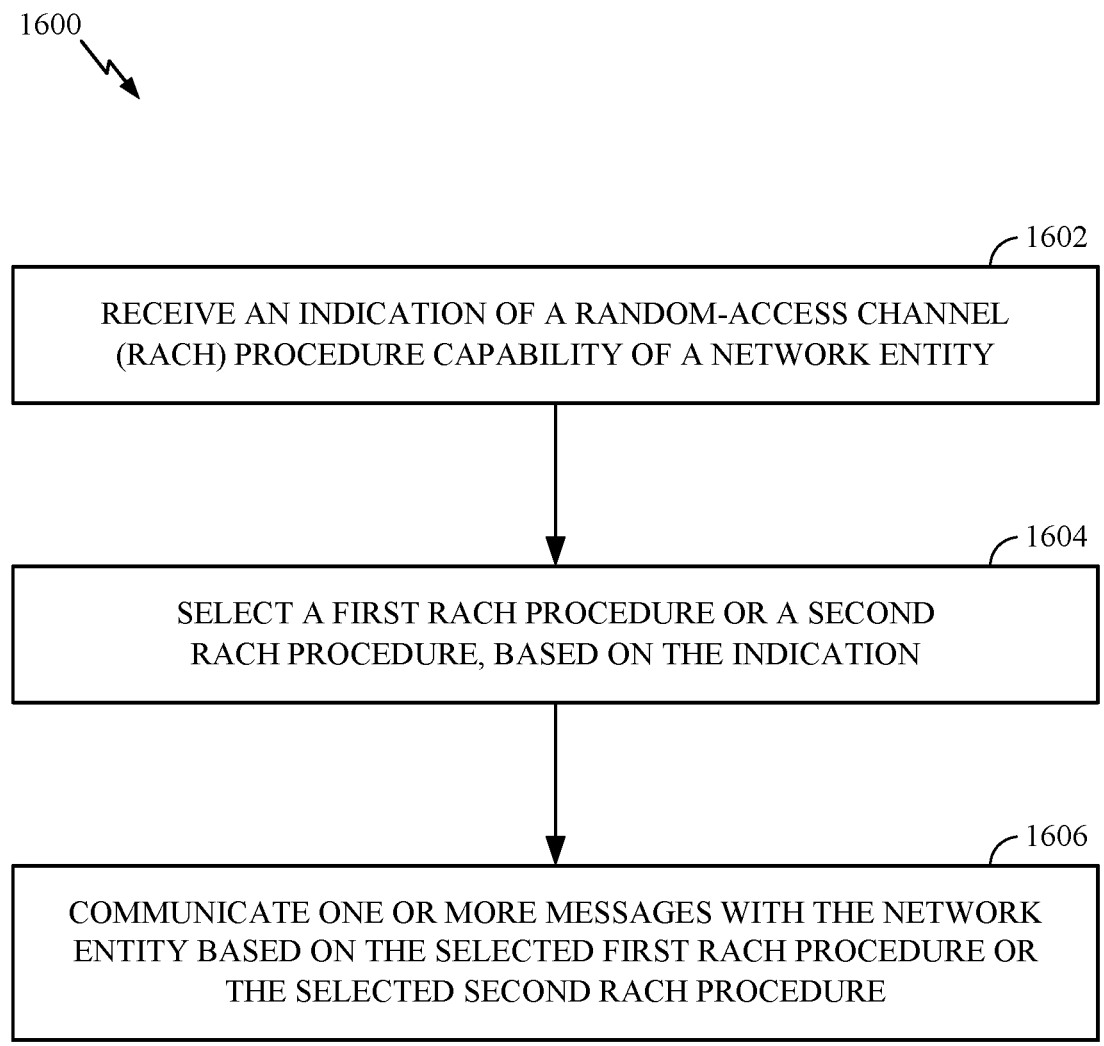
FIG. 16 illustrates example operations for wireless communication by a user equipment (UE), in accordance with certain aspects of the present disclosure.

FIG. 16 illustrates example operations 1600 for wireless communication, in accordance with certain aspects of the present disclosure. The operations 1600 may be performed by, for example, a UE, such as the UE 120.

The operations 1600 begin, at block 1602, by receiving an indication of a random-access channel (RACH) procedure capability of a network entity, and at block 1604, selecting a first RACH procedure or a second RACH procedure, based on the indication. At block 1606, one or more messages may be communicated with the network entity based on the selected first RACH procedure or the selected second RACH procedure.

Figure 17:
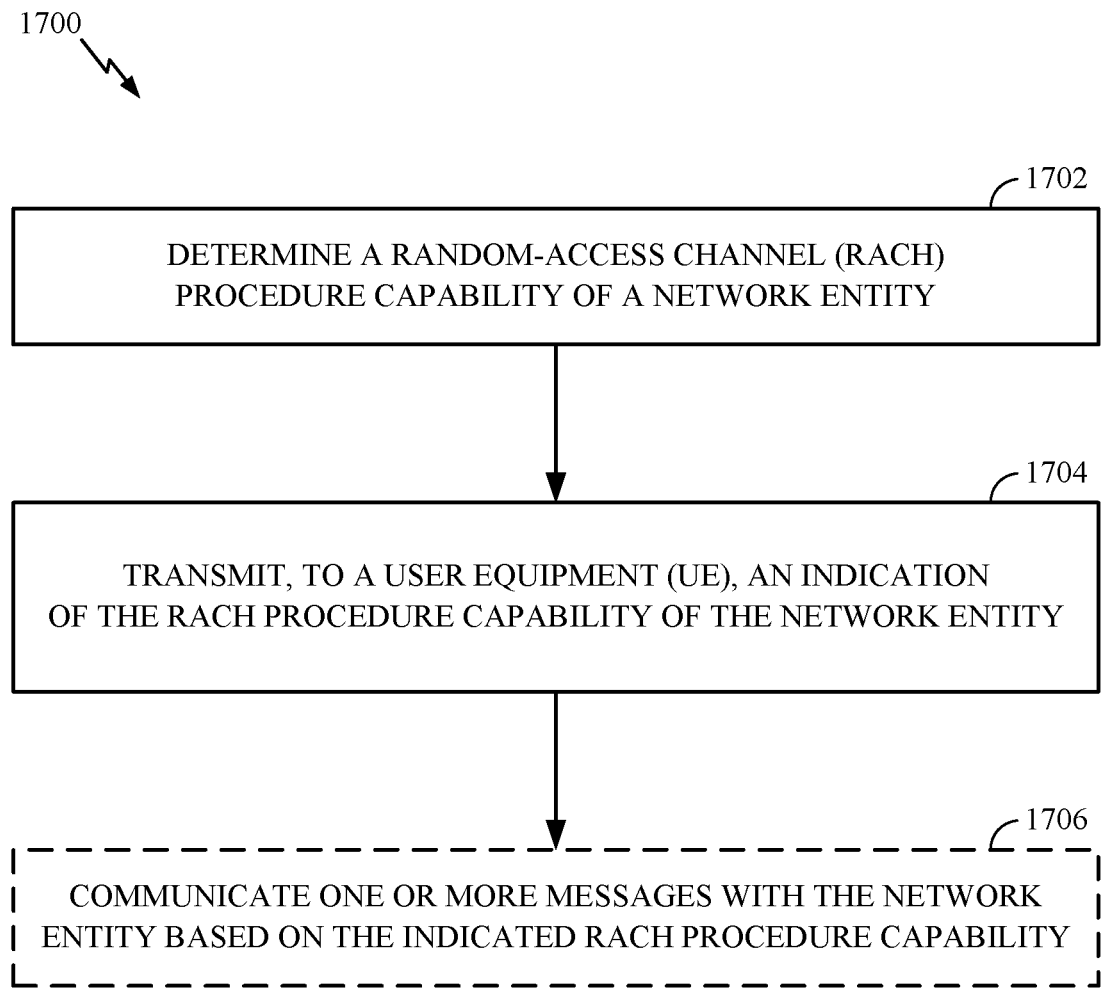
FIG. 17 illustrates example operations for wireless communication by a network entity, in accordance with certain aspects of the present disclosure.

FIG. 17 illustrates example operations 1700 for wireless communication, in accordance with certain aspects of the present disclosure. The operations 1700 may be performed by, for example, a network entity, such as the network entity 110a.

The operations 1700 begin, at block 1702, by determining a RACH procedure capability of a network entity (e.g., the network entity performing the operation 1700 or a target eNB). At block 1704, the operations 1700 continue by transmitting, to a UE, an indication of a RACH procedure capability of the network entity.

Figure 18:
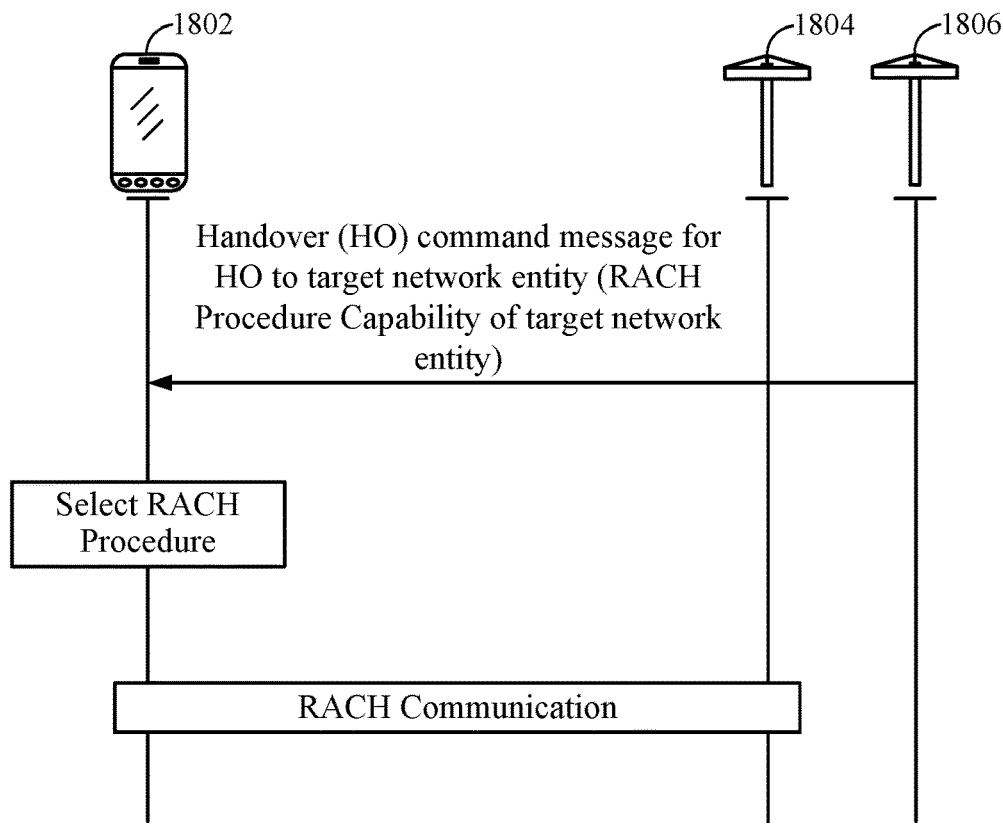
FIG. 18 illustrates a communication protocol for communicating a RACH procedure capability via a handover (HO) command message, in accordance with certain aspects of the present disclosure.

In certain aspects, the transmission, at block 1704, may include transmitting a HO command message for HO of the UE to the network entity (e.g., the target eNB), as described in more detail with respect to FIG. 18. The HO command message may include the indication of the RACH procedure of the network entity.

FIG. 18 illustrates a communication protocol 1800 for communicating a RACH procedure capability via a HO command message, in accordance with certain aspects of the present disclosure. As illustrated, the network entity 1806 may transmit a HO command message to HO the UE 1802 to the target network entity 1804. The HO command message may include an indication of the RACH procedure capability of the target network entity 1804. For example, the UE 1802 may be in HO procedure in RRC-connected active mode. The network entity 1806 may be aware of the RACH procedure supported by the target network entity 1804, and indicate the supported RACH procedure of the target network entity 1804 in the HO command message to the UE 1802 to be used by the UE 1802 to determine the RACH procedure for RACH communications with the target network entity 1804.

Figure 19:
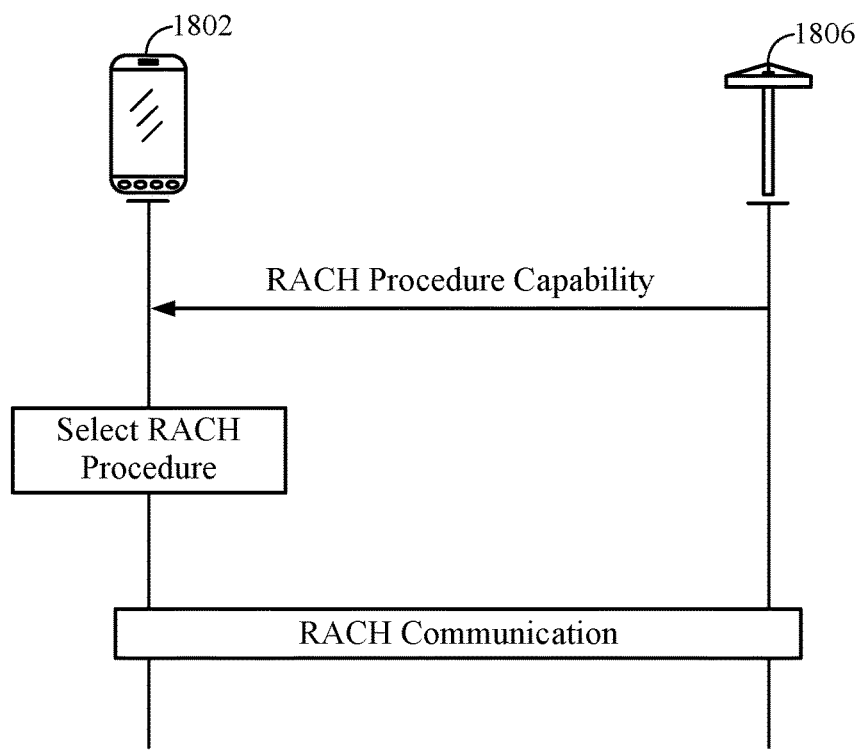
FIG. 19 illustrates a communication protocol for communicating a RACH procedure capability, in accordance with certain aspects of the present disclosure.

Returning to FIG. 17, in certain aspects, the operations 1700 of FIG. 17 may optionally include, at block 1706, communicating one or more messages with the UE based on the indicated RACH procedure capability, as described in more detail with respect to FIG. 19.

FIG. 19 illustrates a communication protocol 1900 for communicating a RACH procedure capability, in accordance with certain aspects of the present disclosure. In this case, the network entity 1806 indicates the RACH procedure capability of the network entity 1806. The RACH procedure capability is used by the UE 1802 to determine the RACH procedure for RACH communications with the network entity 1806, as illustrated.

In some cases, the indication of the RACH procedure may be transmitted, at block 1704, to the UE in system information block (e.g., Master information block (MIB) or Minimum system information block (MSIB)). The indication of the RACH procedure capability may indicate support for four-step RACH procedure only, two-step RACH procedure only, or both two-step and four-step RACH procedures.

Certain aspects of the present disclosure are directed to techniques for the UE to select either the two-step or the four-step RACH procedures in a scenario where the indication of the RACH procedure capability indicates support for both the two-step and the four-step RACH procedures, and moreover, techniques for informing a network entity of the selected RACH procedure. If the UE supports both the two-step and the four-step RACH procedures, the UE might autonomously select a RACH procedure. For example, some selection priority (e.g., picking two-step RACH procedure first) might be applied for this selection. If the UE can only support one of the two-step or the four-step RACH procedures, the UE selects the RACH procedure it can support.

In certain aspects, the network entity (e.g., network entity 1804 or 1806) may detect whether the UE has selected (e.g., is performing) a two-step or a four-step RACH procedure via the RACH preamble. For example, two designs (e.g., types) of the RACH preamble may be provided, each corresponding to a different RACH procedure. For example, the different RACH preamble designs may have different RACH preamble sequences. If the RACH preamble corresponding to the four-step RACH procedure is detected, the network entity may determine that the four-step RACH procedure is being used by the UE. Thus, since MSG1 of the four-step RACH procedure only includes the RACH preamble, no RACH message decoding may be initiated by the network entity. However, if the RACH preamble corresponding to the two-step RACH procedure is detected, RACH message decoding may be initiated by the network entity.

In certain aspects, the type of the PRACH (e.g., the selected RACH procedure) may be frequency division multiplexed. For example, the UE may transmit a first type of PRACH (e.g., for a two-step RACH procedure which includes both a RACH preamble and a RACH message) over a first subband while transmitting a second type of PRACH (e.g., for a four-step RACH procedure which includes only the RACH preamble) over a second subband. At any point in time, one PRACH type may be transmitted. The network entity may then monitor both the first subband and the second subband for PRACH detection and decoding. For example, the network entity may determine the RACH procedure based on whether the PRACH is received on the first subband or the second subband.

Certain aspects of the present disclosure are generally directed to a fallback mechanism used to switch between the two-step and the four-step RACH procedures. For example, when the UE is operating with a two-step RACH procedure, the UE may detect a fall back scenario, and fall back to the four-step RACH procedure. In certain aspects, the fall back scenario may include detecting an unsuccessful transmission of eMSG1 of the RACH communication over a certain number of retransmissions. In some cases, the unsuccessful transmission of eMSG1 may be detected if the corresponding eMSG2 is not successfully received (e.g., decoded) by the UE.

Once the UE falls back to the four-step RACH procedure, the UE may begin using the RACH preamble corresponding to the four-step RACH procedure. Based on the RACH preamble, the network entity may detect that the UE is using the four-step RACH procedure, as described above.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c"

is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a UE 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE), comprising:
  receiving an indication of a random-access channel (RACH) procedure capability of a network entity;
  selecting a first RACH procedure or a second RACH procedure, based on the indication, wherein the first RACH procedure and the second RACH procedure comprise contention-based RACH procedures;
  selecting a sequence for a RACH preamble to indicate, to the network entity, whether the first RACH procedure or the second RACH procedure is selected;
  generating the RACH preamble based on the selection of the sequence; and
  communicating one or more messages with the network entity based on the selected first RACH procedure or the selected second RACH procedure, wherein communicating the one or more messages comprises transmitting the RACH preamble.

2. The method of claim 1, further comprising receiving system information from the network entity, wherein the system information comprises the indication of the RACH procedure capability.

3. The method of claim 2, wherein the system information comprises minimum system information (MSI) or other system information (OSI).

4. The method of claim 1, wherein the indication of the RACH procedure is received from another network entity in a handover (HO) command message for HO of the UE to the network entity.

5. The method of claim 1, wherein the indication of the RACH procedure indicates that the network entity supports both the first RACH procedure and the second RACH procedure.

6. The method of claim 1, wherein the selection comprises selecting the first RACH procedure, the method further comprising:
  detecting an unsuccessful communication of the one or more messages;
  selecting the second RACH procedure based on the detection; and
  communicating one or more other messages with the network entity based on the selection of the second RACH procedure.

7. The method of claim 1, wherein:
  the first RACH procedure comprises a two-step RACH procedure; and
  the communication of the one or more messages comprises:
    transmitting the RACH preamble and a RACH message; and
    receiving a random access response (RAR) in response to the transmission of the RACH preamble and the RACH message.

8. The method of claim 1, wherein:
  the second RACH procedure comprises a four-step RACH procedure; and
  the communication of the one or more messages comprises:
    receiving a random access response (RAR) in response to the transmission of the RACH preamble;
    transmitting a random access connection request in response to the reception of the RAR; and
    receiving a contention resolution message in response to the random access connection request.

9. A method for wireless communication by a user equipment (UE), comprising:
  receiving an indication of a random-access channel (RACH) procedure capability of a network entity;
  selecting a first RACH procedure or a second RACH procedure, based on the indication;
  selecting a sequence for a RACH preamble to indicate, to the network entity, whether the first RACH procedure or the second RACH procedure is selected;
  generating the RACH preamble based on the selection of the sequence; and
  communicating one or more messages with the network entity based on the selected first RACH procedure or the selected second RACH procedure, wherein communicating the one or more messages comprises transmitting the RACH preamble, wherein:
the indication of the RACH procedure indicates that the network entity supports both the first RACH procedure and the second RACH procedure;
the communication comprises transmitting the RACH preamble and a RACH message to the network entity over a first subband if the first RACH procedure is selected; and
the communication comprises transmitting the RACH preamble to the network entity over a second subband if the second RACH procedure is selected.

10. The method of claim 9, wherein the first RACH procedure and the second RACH procedure comprise contention-based RACH procedures.

11. A method for wireless communication, comprising:
determining a random-access channel (RACH) procedure capability of a network entity;
transmitting, to a user equipment (UE), an indication of the RACH procedure capability of the network entity;
communicating one or more messages in accordance with the RACH procedure capability, wherein communicating the one or more messages comprises receiving a first message including a RACH preamble after transmitting the indication of the RACH procedure capability;
determining whether a first RACH procedure or a second RACH procedure corresponds to the first message based on a sequence of the RACH preamble, wherein the first RACH procedure and the second RACH procedure comprise contention-based RACH procedures; and
decoding the first message based on the determination.

12. The method of claim 11, wherein the transmission comprises transmitting system information to the UE, wherein the system information comprises the indication of the RACH procedure capability.

13. The method of claim 12, wherein the system information comprises minimum system information (MSI) or other system information (OSI).

14. The method of claim 11, wherein:
determining the RACH procedure corresponding to the first message comprises determining whether the first message comprises a RACH message based on the RACH preamble; and
decoding the first message comprises decoding the RACH message if the first message comprises the RACH message based on the determination.

15. The method of claim 14, wherein the indication of the RACH procedure capability indicates that the network entity supports both a first RACH procedure and a second RACH procedure.

16. The method of claim 11, wherein:
the one or more messages are communicated based on a two-step RACH procedure; and
the communication of the one or more messages comprises:
receiving the RACH preamble and a RACH message; and
transmitting a random access response in response to the reception of the RACH preamble and the RACH message.

17. The method of claim 11, wherein:
the one or more messages are communicated based on a four-step RACH procedure; and
the communication of the one or more messages comprises:
transmitting a random access response (RAR) in response to the transmission of the RACH preamble;
receiving a random access connection request in response to the reception of the RAR; and
transmitting a contention resolution message in response to the random access connection request.

18. A method for wireless communication, comprising:
determining a random-access channel (RACH) procedure capability of a network entity;
transmitting, to a user equipment (UE), an indication of the RACH procedure capability of the network entity;
communicating one or more messages in accordance with the RACH procedure capability, wherein communicating the one or more messages comprises receiving a first message including a RACH preamble after transmitting the indication of the RACH procedure capability;
monitoring a first subband and a second subband, for the RACH preamble;
determining whether a first RACH procedure or a second RACH procedure corresponds to the first message based on a sequence of the RACH preamble, wherein the determination of whether the first message comprises the RACH message is based on whether the RACH preamble is received on the first subband or the second subband; and
decoding the first message based on the determination, wherein:
determining the RACH procedure corresponding to the first message comprises determining whether the first message comprises a RACH message based on the RACH preamble; and
decoding the first message comprises decoding the RACH message if the first message comprises the RACH message based on the determination.

19. An apparatus for wireless communication by a user equipment (UE), comprising:
a transceiver configured to receive an indication of a random-access channel (RACH) procedure capability of a network entity;
a processing system configured to:
select a first RACH procedure or a second RACH procedure, based on the indication, wherein the first RACH procedure and the second RACH procedure comprise contention-based RACH procedures;
select a sequence of a RACH preamble to indicate whether the first RACH procedure or the second RACH procedure is selected; and
generate the RACH preamble based on the selection of the sequence, wherein:
the transceiver is further configured to communicate one or more messages with the network entity based on the selected first RACH procedure or the selected second RACH procedure, wherein to communicate the one or more messages, the transceiver is further configured to transmit the RACH preamble.

20. The apparatus of claim 19, wherein the indication of the RACH procedure is received from another network entity in a handover (HO) command message for HO of the UE to the network entity.

21. An apparatus for wireless communication, comprising:
a processing system configured to determine a random-access channel (RACH) procedure capability of a network entity; and a transceiver configured to:
   transmit, to a user equipment (UE), an indication of the RACH procedure capability of the network entity; and
   communicate one or more messages in accordance with the RACH procedure capability, wherein communicating the one or more messages comprises receiving a first message including a RACH preamble after transmitting the indication of the RACH procedure capability;
wherein the processing system is further configured to:
   determine whether a first RACH procedure or a second RACH procedure corresponds to the first message based on a sequence of the RACH preamble, wherein the first RACH procedure and the second RACH procedure comprise contention-based RACH procedures; and
   decode the first message based on the determination.

\* \* \* \* \*